Jan. 14, 1969 W. L. MAU ET AL Re. 26,518

THREAD AND OTHER FORM ROLLING DIES

Original Filed Jan. 13, 1958

Sheet 1 of 7

INVENTORS
WILLIAM L. MAU &
ERNEST A. NAGY

BY

Hyde, Meyer, Baldwin & Dolan
ATTORNEYS

THREAD AND OTHER FORM ROLLING DIES
Original Filed Jan. 13, 1958
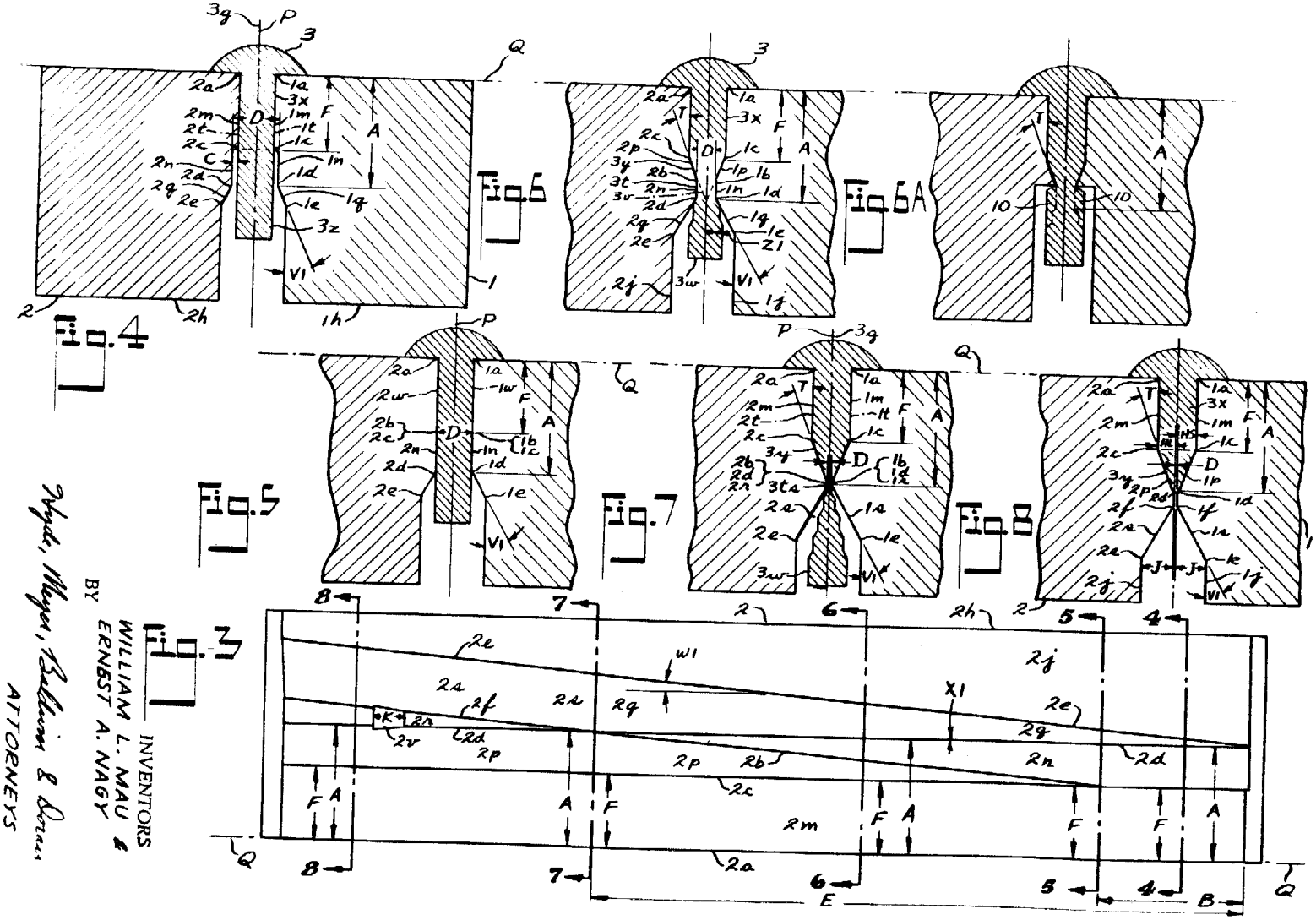
INVENTORS
WILLIAM L. MAU &
ERNEST A. NAGY
BY
Hyde, Meyer, Baldwin & Doran
ATTORNEYS

THREAD AND OTHER FORM ROLLING DIES

Original Filed Jan. 13, 1958

INVENTORS
WILLIAM L. MAU &
ERNEST A. NAGY
BY
Hyde, Meyer, Baldwin & Doran
ATTORNEYS THREAD AND OTHER FORM ROLLING DIES
Original Filed Jan. 13, 1958
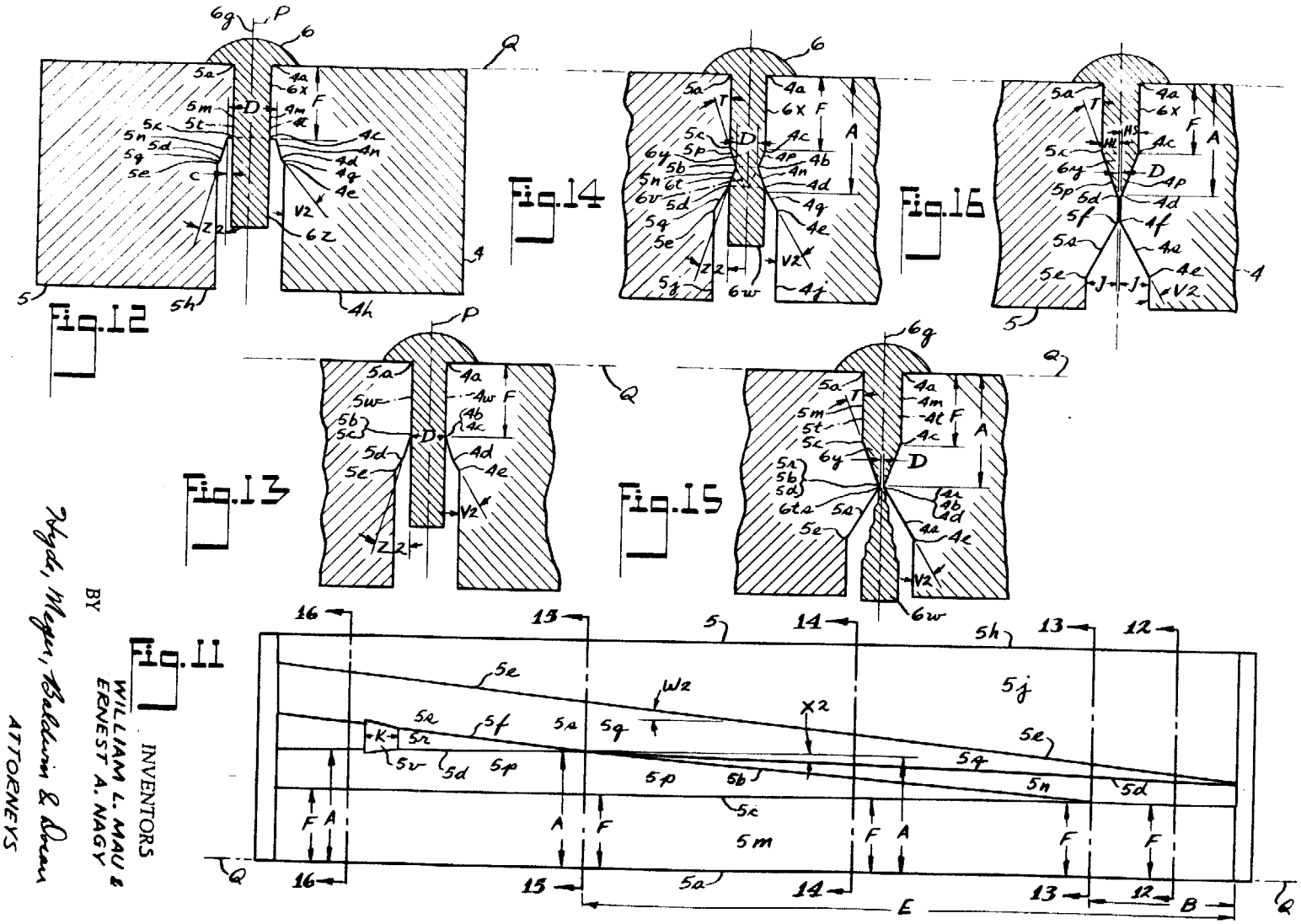
INVENTORS
WILLIAM L. MAU &
ERNEST A. NAGY
BY
Hyde, Meyer, Baldwin & Doran
ATTORNEYS

INVENTORS
WILLIAM L. MAU &
ERNEST A. NAGY

BY

Hyde, Meyer, Baldwin & Doran
ATTORNEYS

THREAD AND OTHER FORM ROLLING DIES

Original Filed Jan. 13, 1958

INVENTORS
WILLIAM L. MAU &
ERNEST A. NAGY

BY

Hyde, Meyer, Baldwin & Doran
ATTORNEYS

INVENTORS
WILLIAM L. MAU &
ERNEST A NAGY
BY
Hyde, Meyer, Baldwin & Doran
ATTORNEYS United States Patent Office Re. 26,518
Reissued Jan. 14, 1969

26,518

THREAD AND OTHER FORM ROLLING DIES

William L. Mau, Shaker Heights, and Ernest A. Nagy, Cleveland, Ohio, assignors to The National Rolled Thread Die Co., Cleveland, Ohio, a corporation of Ohio Original No. 3,176,491, dated Apr. 6, 1965, Ser. No. 708,706, Jan. 13, 1958. Application for reissue Apr. 5, 1967, Ser. No. 641,057
U.S. Cl. 72—71 35 Claims
Int. Cl. B21h *3/06;* B21d *28/00*

Matter enclosed in heavy brackets [ ] appears in the original patent but forms no part of this reissue specification; matter printed in italics indicates the additions made by reissue.

*ABSTRACT OF THE DISCLOSURE*

*Thread rolling dies for cold forming gimlet point screws from a cylindrical metal workpiece having a body thread rolling surface for forming a helical thread on the cylindrical body portion of the screw, a point threading surface with a first zone gradually increasing in width for rolling threads on the tapered point of the screw as it is formed and a second zone for completing threading of said point, means for extruding the metal axially to form the tapered point comprising a reservoir and connecting portion forming surface having a point forming side edge extending the length of said first zone, being inclined from that edge away from the axis of the workpiece at an angle of 0 up to 20 degrees, and converging in the direction of rolling of the workpiece from the beginning to the end of said first zone and toward the workpiece axis, and lateral serrations on said reservoir and connecting portion forming surface for positively rotating the workpiece.*

This invention relates *to a method and* to improvements in a die or coacting dies for rolling threads or other forms on workpieces, for forming a full point of any suitable shape on a workpiece by extrusion, for threading or rolling forms on this pointed portion, and/or for severing excess material existing beyond a fully formed point, and relates more particularly to dies for rolling gimlet point screws and bolts.

One of the objects of the present invention is to produce a pointed product or gimlet point screw thread or blank having a full, sharp point, instead of a blunt or hollow point, having excess material extending beyond the point, and/or having excess variation in point length.

A further object of the present invention is to provide an apparatus assuring that at least sufficient material, and perhaps an excess of material, is presented at all times during point forming to assure a full point; and/or means for removing any excess material which may exist once the full point has been obtained.

A further object of the present invention is to provide *a method and* an apparatus wherein a workpiece material rupture force is not exerted during extrusion type point formation between the partially formed point and a reservoir of material attached thereto sufficient to complete the point formation by continued extrusion.

A further object of the present invention is to provide a severance means for severing excess material extending beyond a formed point by extrusion of the material into an extremely thin cross sectional dimension, by a wedge axially forcing a slug of the excess material away from the point, by periodically oscillating the excess material in a transverse direction relative to the point, and/or by wiping off the excess material by suitable barrier means with or without the aforementioned relative transverse movement with respect to the point.

A further object of the invention is to provide an apparatus wherein a reservoir of material remains affixed to a partially formed point until the point is fully formed and wherein the reservoir is of sufficient volume to assure full formation of the point.

A further object of the present invention is to provide means for frictionally engaging the surface of the workpiece for positive rotation thereof during roll forming by relatively moving dies.

A further object of the present invention is to provide apparatus for performing one or more of the desired functions disclosed herein and characterized by its structural simplicity, economy of manufacture, operating efficiency, strong and sturdy nature, ease of operation or use, and/or multiplicity of desirable operations performed simultaneously at different stages of operation.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 3 is a side elevational view of the die blank before the threads and serrations have been machined therein to make the finished die shown in FIG. 1 with sections 4—4, 5—5, 6—6, 7—7 and 8—8 shown thereon in the same manner as in FIG. 2;

FIG. 4 is a transverse sectional view taken along the line 4—4 of FIG. 2 when these section lines on the upper and lower dies are in vertical alignment prior to horizontal movement of the upper die to the FIG. 2 position and with the workpiece diametrically bisected by these section lines but with the threads omitted because blanks, as in FIG. 3, were used in FIG. 2;

FIG. 5 is a transverse sectional view taken along the line 5—5 of FIG. 2 when these section lines on the upper and lower dies are in vertical alignment prior to horizontal movement of the upper die to the FIG. 2 position and with the workpiece diametrically bisected by these section lines but with the threads omitted because blanks, as in FIG. 3, were used in FIG. 2;

FIG. 6A is a transverse sectional view, similar to FIG. 6, of a different form of die construction, which has inherent disadvantages overcome by the present invention;

FIG. 7 is a transverse sectional view taken along the line 7—7 of FIG. 2 where these section lines on the upper and lower dies are in vertical alignment by horizontal movement of the upper die and with the workpiece diametrically bisected by these section lines but with the threads omitted because blanks, as in FIG. 3, were used in FIG. 2;

FIG. 8 is a transverse sectional view taken along the line 8—8 of FIG. 2 when these section lines on the upper and lower dies are in vertical alignment by horizontal movement of the upper die and with the workpiece diametrically bisected by these section lines but with the threads omitted because blanks, as in FIG. 3, were used in FIG. 2;

FIG. 9 is a side elevational view of the short die of a second form of thread rolling platen dies in the set disclosed in FIG. 10;

FIG. 11 is a side elevational view of the die blank before the threads and serrations have been machined therein to make the finished die shown in FIG. 9 with sections 12—12, 13—13, 14—14, 15—15 and 16—16 shown thereon in the same manner as in FIG. 10;

FIG. 12 is a transverse sectional view taken along the line 12—12 of FIG. 10 when these section lines on the upper and lower dies are in vertical alignment prior to horizontal movement of the upper die to the FIG. 10 position and with the workpiece diametrically bisected by these section lines but with the threads omitted because blanks, as in FIG. 11, were used [.] in FIG. 10;

FIG. 13 is a transverse sectional view taken along the line 13—13 of FIG. 10 when these section lines on the upper and lower dies are in vertical alignment prior to horizontal movement of the upper die to the FIG. 10 position and with the workpiece diametrically bisected by these section lines but with the threads omitted because blanks, as in FIG. 11, were used in FIG. 10;

FIG. 14 is a transverse sectional view taken along the line 14—14 of FIG. 10 when these section lines on the upper and lower dies are in vertical alignment prior to horizontal movement of the upper die to the FIG. 10 position and with the workpiece diametrically bisected by these section lines but with the threads omitted because blanks, as in FIG. 11, were used in FIG. 10;

FIG. 15 is a transverse sectional view taken along the line 15—15 of FIG. 10 when these section lines on the upper and lower dies are in vertical alignment by horizontal movement of the upper die and with the workpiece diametrically bisected by these section lines but with the threads omitted because blanks, as in FIG. 11, were used in FIG. 10;

FIG. 16 is a transverse sectional view taken along the line 16—16 of FIG. 10 when these section lines on the upper and lower dies are in vertical alignment by horizontal movement of the upper die and with the workpiece diametrically bisected by these section lines but with the threads omitted because blanks, as in FIG. 11, were used in FIG. 10;

FIG. 23 is a transverse sectional view taken along the line 23—23 of FIG. 18 when these section lines on the upper and lower dies are in vertical alignment by horizontal movement of the upper die and with the workpiece diametrically bisected by these section lines but with the threads omitted because blanks, as in FIG. 19, were used in FIG. 18;

Figure 1:
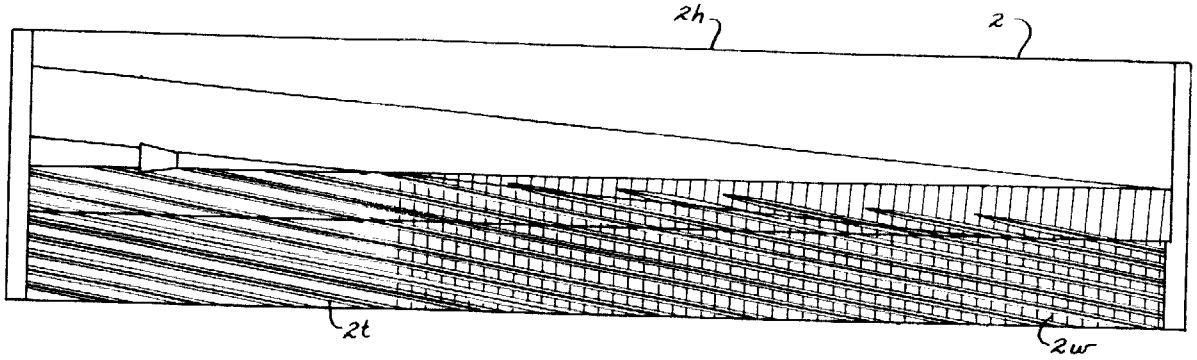
FIG. 1 is a side elevational view of the short die of a first form of thread rolling platen dies in the set disclosed in FIG. 2.
Figure 2:
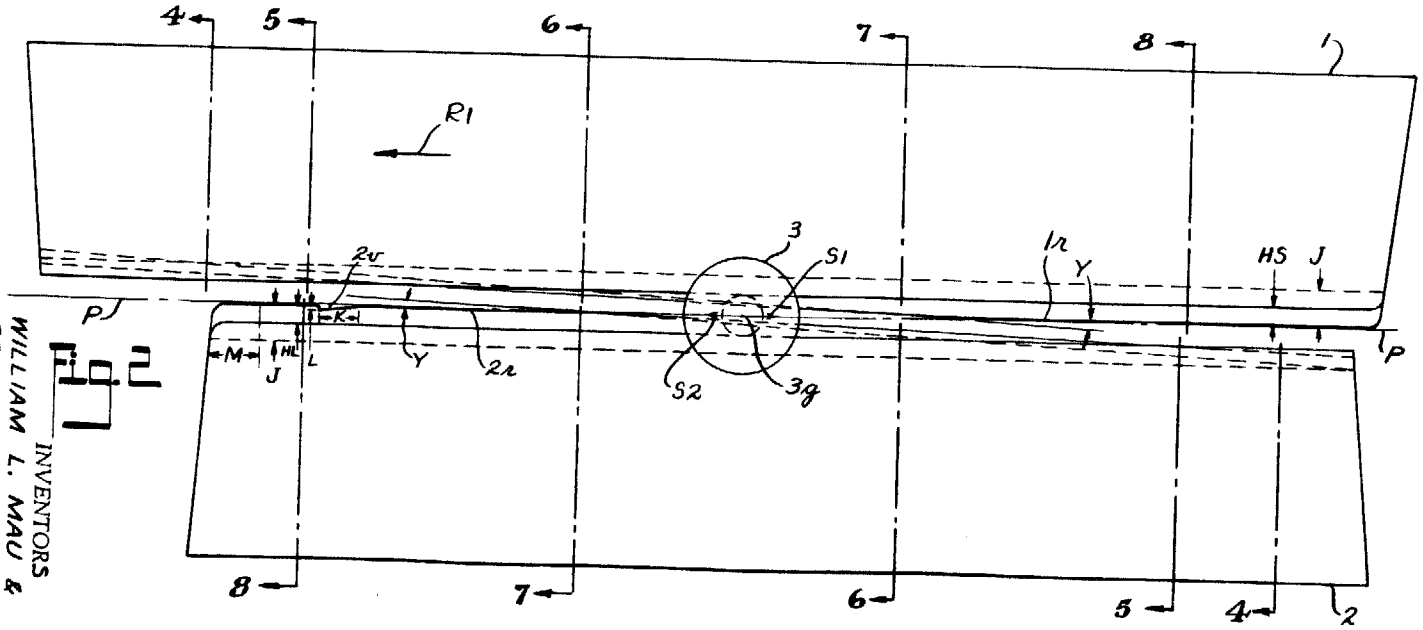
FIG. 2 is a top plan view of the two thread rolling dies of this platen die set adapted to roll threads upon a workpiece with the die of FIG. 1 being the short or lower die of the set but with these dies in FIG. 2 shown as die blanks prior to application of the threads and serrations of FIG. 1 for simplicity of illustrations.
Figures 19, 20, 21, 22, 24, 27:
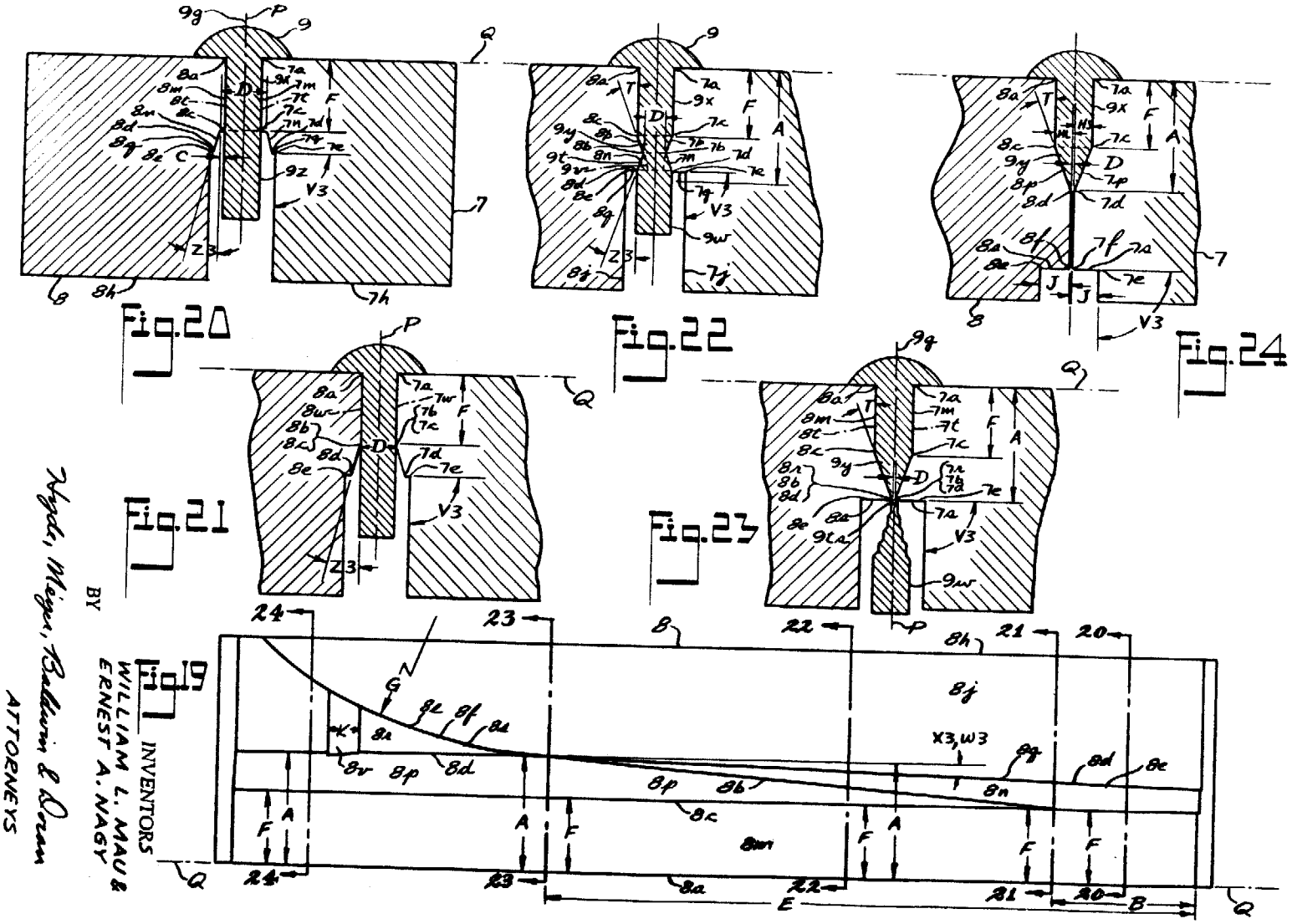
FIG. 19 is a side elevational view of the die blank before the threads and serrations have been machined therein to make the finished die shown in FIG. 17 with sections 20—20, 21—21, 22—22, 23—23 and 24—24 shown thereon in the same manner as in FIG. 18.
FIG. 20 is a transverse sectional view taken along the line 20—20 of FIG. 18 when these section lines on the upper and lower dies are in vertical alignment prior to horizontal movement of the upper die to the FIG. 18 position and with the workpiece diametrically bisected by these section lines but with the threads omitted because blanks, as in FIG. 19, were used, in FIG.18.
FIG. 21 is a transverse sectional view taken along the line 21—21 of FIG. 18 when these section lines on the upper and lower dies are in vertical alignment prior to horizontal movement of the upper die to the FIG. 18 position and with the workpiece diametrically bisected by these section lines but with the threads omitted because blanks, as in FIG. 19, [where] *were* used in FIG. 18.
FIG. 22 is a transverse sectional view taken along the line 22—22 of FIG. 18 when these section lines on the upper and lower dies are in vertical alignment prior to horizontal movement of the upper die to the FIG. 18 position and with the workpiece diametrically bisected by these section lines but with the threads omitted because blanks, as in FIG. 19, were used in FIG. 18.
FIG. 24 is a transverse sectional view taken along the line 24—24 of FIG. 18 when these section lines on the upper and lower dies are in vertical alignment by horizontal movement of the upper die and with the workpiece diametrically bisected by these section lines but with the threads omitted because blanks, as in FIG. 19, were used in FIG. 18.
Figure 26:
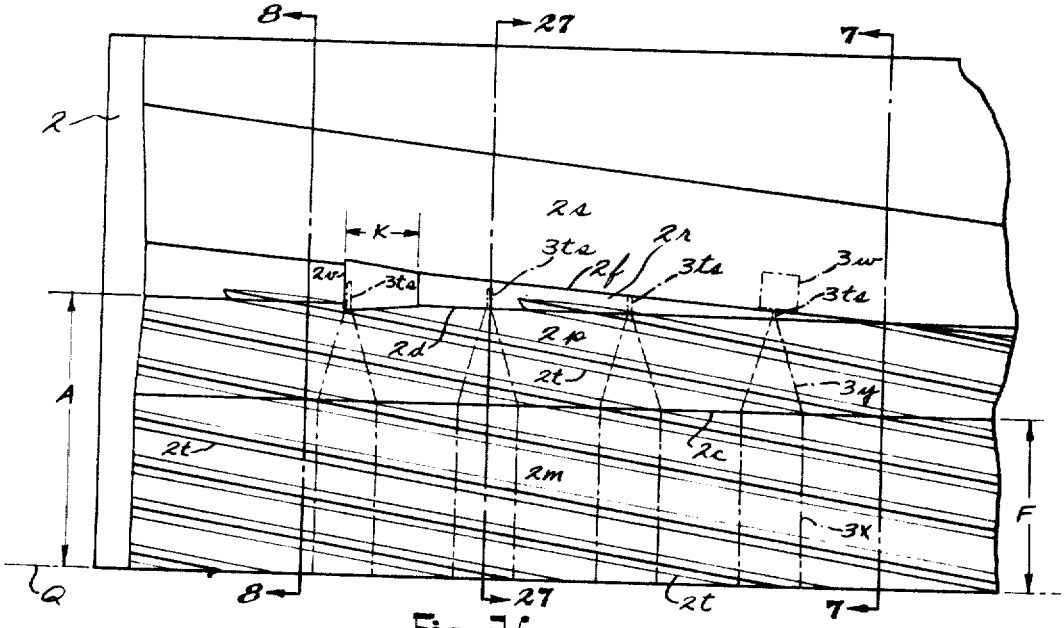
Figure 27:
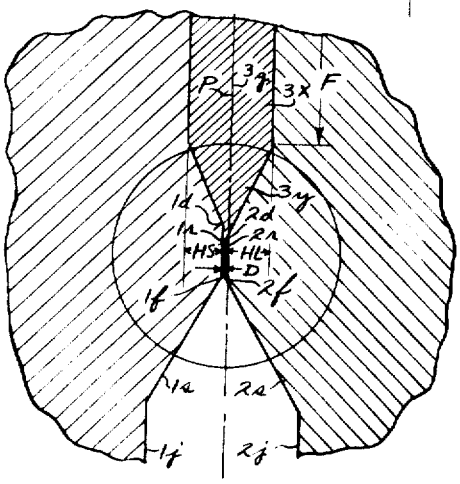
Figure 28:
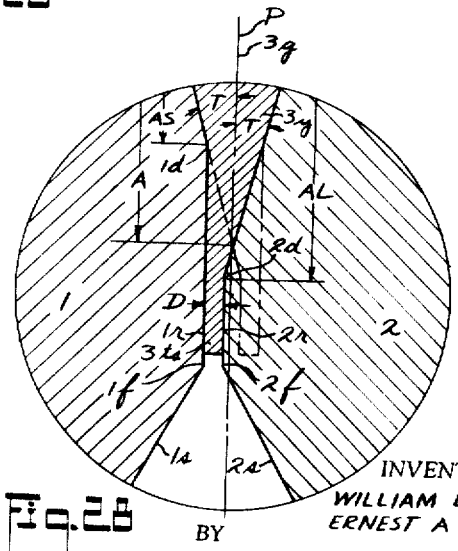

FIG. 26 is a side elevational view of a portion of the same die shown as an enlarged view of the left-hand portion of FIG. 1 with sections 7—7 and 8—8 shown thereon in the same manner as in FIGS. 2 and 3;

FIG. 27 is an enlarged, partial, sectional view taken along the line 27—27 with the upper and lower dies in FIG. 2 coacting together as blanks with the workpiece diametrically sectioned therebetween; while FIG. 28 is an enlarged view of the area enclosed by the circle in FIG. 27.

Before the dies here illustrated are specifically described, it is to be understood that the invention here involved is not limited to the structural details or arrangement of parts here shown since an apparatus, coacting dies, or a single die embodying the present invention may take various forms. It also is to be understood that the phraseology or terminology herein employed is for purposes of description and not of limitation since the scope of the present invention is denoted by the appended claims.

Introduction to generic invention

Figure 25:
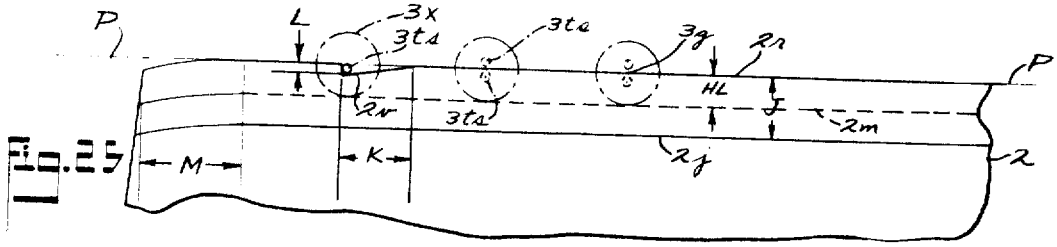
FIG. 25 is an enlarged bottom view of the upper left-hand portion of the lower die in FIG. 2.

FIGS. 1–8 (omitting FIG. 6A) of the first invention form correspond respectively and individually with FIGS. 9–16 of the second form and FIGS. 17–24 of the third form. Each of these FIGS. 1–24 is about twice the size of the conventional thread rolling die to be used in this type machine. FIGS. 25–28 illustrate in more detail some of the structure in FIGS. 1–8 of the first form of the invention. However, it should be noted that the second and third forms of the invention have generically the same operation performing structural components as in FIGS. 25–28. FIGS. 25 and 26 are about four times the conventional die size, FIG. 27 has been enlarged slightly greater, and FIG. 28 is about twice the FIG. 27 size. However, FIGS. 1–28 are scale drawings, wherever possible, of actual dies. It should also be noted that FIGS. 1, 9, 17 and 26 show thread forms and/or serrations on the dies, while the remaining figures disclose for simplicity of illustration the workpiece and dies coacting in blank form prior to thread form and serration cutting therein. The parts in all sectional views (FIGS. 4–8, 6A, 12–15, 20–24, 27 and 28) are only partially crosshatched for clarity of illustration of lead lines and reference numerals.

Since each of the three invention forms has generic structure operating in generically the same way and generic modes of operation, only the first form in FIGS. 1–8 and 25–28 will be described in detail and this will generically apply to the other two forms unless otherwise noted.

While the present invention might be adapted to various types of apparatus and machines, it has been chosen to show the same as platen type form rolling dies for rolling screw threads upon a workpiece by relative reciprocating, parallel movement between the dies in the conventional thread rolling machine. Although the workpiece may be formed of any *extrudable, commercially employed* material, these dies work well on steel workpieces. Here, one die, such as the shorter die 2 in FIG. 2, is held stationary while the other die, such as the longer die 1, moves in the direction of the arrow thereon in a direction parallel to longitudinal reference plane P in which the axis of rotation 3g of the body portion of the workpiece 3 travels, or moves laterally, in a direction normal to that axis so that axis 3g generates plane P.

However, it should be readily apparent that many aspects of this invention may be applied to other type apparatus for rolling threads or forms on workpieces. For example, workpiece axis 3g may travel along a curved longitudinal surface, generated by axis 3g, instead of the longitudinal plane P if the dies rotate with respect to each other instead of reciprocating and have arcuately shaped workpiece contacting surfaces. Also, it should be readily apparent that the apparatus may retain the workpiece axis 3g against lateral movement, here shown as along plane P, while both dies move in opposite directions to rotate and form the workpiece instead of having one die stationary.

In the disclosed apparatus and in each of the two mentioned in the preceding paragraph, the die, such as die 1, is adapted to coact with another die, such as die 2, with these dies being relatively movable for rotating a cylindrical workpiece 3, here formed of extrudable and work-hardenable material, having cylindrical body portion 3x in FIG. 4 rotatable about its longitudinal axis of rotation 3g and having a cylindrical extrudable portion 3z, separated for illustration purposes from body portion 3x by dotted lines in FIG. 4, for forming a gimlet point screw threaded product, shaped similar to the workpiece blank shown in FIG. 8 but having a threaded body portion 3x and a threaded point 3y, separated by dotted lines in FIG. 8 for illustration purposes, so formed by relative advancing movement between dies 1 and 2 and axis 3g by moving die 1 in the direction of the arrow R1 in FIG. 2. This relative die movement also provides an axis advancing direction relative to each die for workpiece axis 3g. This axis advancing direction for axis 3g in FIG. 2 is toward the left in direction S2 relative to stationary die 2, but is toward the right in FIG. 2 in direction S1 relative to die 1, which is moving toward the left in direction R1 faster than workpiece 3 (at approximately twice the speed). Directions S1 and S2 are in plane P. It should be evident that even if the workpiece axis 3g were stationary in the second alternate form of apparatus mentioned heretofore, while the dies both move to rotate workpiece 3 about axis 3g, the workpiece axis 3g would still be advancing in a direction relative to each die in a direction opposite to the direction of die movement so as to form a reference surface P.

Figure 6:
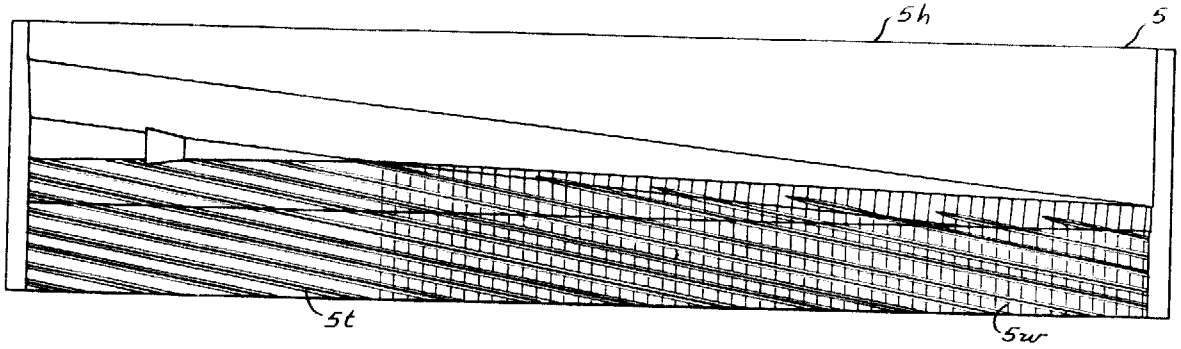
FIG. 6 is a transverse sectional view taken along the line 6—6 of FIG. 2 when these section lines on the upper and lower dies are in vertical alignment prior to horizontal movement of the upper die to the FIG. 2 position and with the workpiece diametrically bisected by these section lines but with the threads omitted because blanks, as in FIG. 3, were used in FIG. 2.

The workpiece 3, as it is formed, has extrudable portion 3z extending downward to form partially or fully formed point 3y with (1) in FIG. 6 before section 7—7 a slug 3w secured to partially or fully formed point 3y by connecting portion 3t including a reservoir 3v integral with the point with these different components separated by dotted lines for illustration purposes in FIG. 6, and (2) in FIG. 7 at and after section 7—7 a slug 3w secured to fully formed point 3y by connecting or extending portion 3ts. Reservoir [3b] *3v* may, depending upon material flow, take any suitable shape, with the shape shown being given as only illustrative of one possible example, as long as the volume of the reservoir is sufficient to complete the formation of point 3y.

Now, it should be evident that in each of these three types of apparatus, the longitudinal workpiece axis of rotation 3g lies in a longitudinal reference surface, here shown as longitudinal reference plane P in which axis 3g travels, and a transverse reference plane Q in FIG. 4–8 extends perpendicular to this axis of rotation 3g to provide orientation surfaces to make the description clearer hereinafter.

Although only the first form of the invention in FIGS. 1–8 has been mentioned heretofore, it should be readily apparent that the same description applies with respect to the second and third forms of invention because FIGS. 9–16, FIGS. 17–24, and FIGS. 1–8 correspond. Also dies 1 and 2; workpiece 3 with body portion 3x, point 3y, extrudable portion 3z, connecting portion 3t, reservoir 3v, slug 3w, and axis of body portion rotation 3g; longitudinal reference plane P and transverse reference plane Q in FIGS. 1–8 correspond respectively with dies 4 and 5; workpiece 6 with body portion 6x, point 6y, extrudable portion 6z, connecting portion 6t, reservoir 6v, slug 6w, and axis of body portion rotation 6g; longitudinal reference plane P and transverse reference plane Q in FIGS. 9–16 and with dies 7 and 8; workpiece 9 with body portion 9x, point 9y, extrudable portion 9z, connecting portion 9t, reserevoir 9v, slug 9w; and axis of body portion rotation 9g; longitudinal reference plane P and transverse reference plane Q in FIGS. 17–24.

Also, it should be readily apparent that although threads are rolled on the workpiece in the present disclosure, any other desired form applied by rolling may be used instead and will work equally satisfactorily.

The present invention relates to dies for use in the rolling of gimlet point screws, bolts and related products, hereinafter generically called workpieces, to be rolled from blanks which either have not been previously prepared for the rolling of the point, such as blanks having cylindrical shanks of uniform diameter as shown in FIG. 4, or from blanks which have been previously prepared for the rolling of the point, such as prepointed blanks wherein a minimum of point forming is required. The drawings of the present application disclose dies having integral portions for not only forming the points but also removing the excess material, sometimes called a pigtail, extending beyond the point, such as shown in FIG. 7, formed during the process of point formation.

The present invention produces a high quality product with a full sharp point by eliminating the following common defects: (1) the finished product has a blunt point because the severing of the excess material occurred in such a manner as to leave insufficient material to allow the full, sharp point to be created; (2) the finished product has a hollow point for the same reason mentioned in the formation of the blunted point product except that the material remaining to form a point after premature severing is displaced toward the point on the surface only while the inner workpiece material of the point holds its position; (3) the finished product carries excess material at or beyond the point, such as the slug in FIG. 7; and/or (4) the products from the dies vary excessively in axial length of point beyond permissible manufacturing tolerances.

To avoid these defects, the three forms of the invention herein disclosed each contain generically the features of: (1) assuring that at least sufficient material, and perhaps an excess of material, is presented to the dies to form the extreme, sharp, and full point; and (2) removing any excess material which may exist once the extreme point has been obtained. Feature No. 1 is disclosed in FIGS. 1–24 and will be first discussed, while feature No. 2 will later be discussed with reference to FIGS. 7, 8, 15, 16 and 23–28.

Introduction to generic point forming

The basic principle on which the aforementioned feature No. 1 is predicated is to maintain the mass of material in the workpiece intact, or at least reservoir 3v intact with point 3y, during the point forming cycle so that the plastic deformation necessary to form the point, such as point 3y, takes place without any severing of the material, i.e., the excess material slug below the point in FIG. 7 does not separate from the finished product located above the *tip of the* point, or if severing should take place, reservoir 3v remains intact with point 3y. This is accomplished by: (a) assuring that the removal of the excess material during extrusion formation of the point does not exert a force greater than the rupture force of the material on the product being formed (this covers designs wherein no force is exerted and designs wherein a force less than the rupture force is exerted), and especially does not exert this rupture force in such a manner as to axially separate reservoir 3v from body portion 3x, so that there will be always sufficient material to form the extreme full sharp point desired; and (b) assuring that the displaced material can flow in a generally axial direction relatively unimpeded along the surface of the dies and preferably forming the slug out beyond the end of the full sharp point. The "rupture force" is the force that must be applied to provide separation of the material. This force may cause the separation by a single type stress, such as a tensile stress, or a combination of stresses, such as a combined tensile and shear stress. In some materials, the rupture point may exist at a lower stress point elongated beyond the ultimate strength or maximum stress which the material may withstand. Hence, then the rupture force must be sufficient to exert the ultimate strength stress on the material and then to elongate the material until rupture occurs.

Although the invention has been illustrated in the drawings and disclosure by describing the formation of a full, sharp point, it should be apparent that many disclosed principles may be used in forming any desired full point, whether sharp, blunt, rounded, or any other shape point, to a predetermined shape and dimension as a fully formed point.

Generic point forming structure

Three forms of the invention are disclosed for point forming by extrusion and for rolling the threads upon the workpieces. The first form is in FIGS. 1–8, the second form is in FIGS. 9–16 and the third form is in FIGS. 17–24. Each form of the invention is generically constructed in the same way and operates generically in the same manner. In each, each coacting die pair performs, in response to relative die movement and workpiece rotation, the action of rolling threads on the associated workpiece, extruding the workpiece material for forming a fully formed point on the workpiece by extrusion of at least a portion of the extrudable portion 3z, as shown in FIGS. 1–8, into point 3y, and frictionally engaging the surface of the workpiece to positively rotate the workpiece 3 about its longitudinal axis 3g by the relative die movement.

Since each structure is the same and operates in the same manner, only dies 1 and 2 and workpiece 3 will be described whenever possible, but dies 4 and 5 and workpiece 6 and dies 7 and 8 and workpiece 9 have basically the same structural component parts, surface shapes, edges, etc., and operate in basically the same manner unless otherwise noted.

This action is shown in FIGS. 4, 12 and 20 wherein the workpiece is shown in its starting and gripping portion of the operation; in FIGS. 5, 13 and 21 wherein the workpiece is at the start of the point forming operation; in FIGS. 6, 14 and 22 wherein the workpiece is partway through the point forming operation; in FIGS. 7, 15 and 23 wherein the point forming operation has been completed and the cutting off or severing operation may or may not have been completed; and in FIGS. 8, 16 and 24 wherein the product is being finish rolled and any remaining excess material is being removed.

The structure of the different forms of the invention is basically the same and the structure in the first form in FIGS. 1–8 will be described in detail. Inasmuch as thread forms play no part in the point forming operation described hereinafter, and in the cut-off or severing action to be described later in the specification, only the die 2, pictured in FIGS. 2–8, will be explained in detail.

A difference is noted in the length of dies 1 and 2 with die 1 being the longer, but this length is solely provided in the conventional manner for endwise adjustment purposes. The preferred endwise adjustment providing the transverse die sections, straddling the workpiece and coaxial with the longitudinal axis 3g thereof, being of generally similar and reversed cross section in workpiece contact as shown in each of the FIGS. 4–8. However, the invention may still work satisfactorily if the endwise adjustment is shifted slightly to bring all the cross sections out of registry by shifting the dies or to reshape the dies so that the distances between sections in the advancing directions may vary to shift one or more cross sections out of registry.

Since the dies are substantially identical, only the illustrated die 2 will be described in detail. The die includes in FIGS. 3–8 a top edge 2a as the die is used in the rolling machine and the edge above which the top of the head of the bolt or screw product travels; a point forming edge 2b for forming workpiece point 3y and being the point of deepest penetration into the workpiece, and defined by angle T and distance from edge 2c, and intersection of surfaces 2n and 2p; edge 2c forming the intersection between body portion 3x and point 3y, and at which angle T intersects the flat face of the die formed by surface 2m; the edge 2d being the intersection of surfaces 2n and 2q and being the point of farthest contact from top edge 2a upon connecting portion 3t, as defined by angle X1, before the workpiece reaches section 7—7; clearance edge 2e at which surface 2q with angle V1 intersects a flat plane or clearance surface 2j at the back of the dies to give clearance to the slug 3w.

The die 2 also has certain dimensions thereon including a nominal thread length A, shown in FIG. 7 as the intersection of angle T with the horizontal plane P; a distance B on the short die only of a maximum of one pitch circumference determining the location or section 5—5; a distance E on the short die only of approximately two-thirds the die face length determining the location of section 7—7; a clearance C between the point forming portion of the dies at distance F from edge 2a and the workpiece during the starting and gripping portions of the operation prior to FIG. 5; distance D between points 1b and 2b between sections 5—5 and 7—7 and between the rises on the dies provided by surfaces 1r and 2r at and to the left of section 7—7 in FIG. 2; and distance F from edge 2a to edge 2c, which distance is a constant for any given pair of dies from one end to the other with the distance measured from the top edge 2a of the die to the body and point intersection edge 2c.

Die 2 also includes point angle T forming the point 3y on the rolled products, usually specified by the product designer or customer and generally 20°; slug clearance angle V1 giving clearance for the slug beyond the thread length and being the angle between surface 2q and clearance surface 2j; remote slug axial separation control angle W1 which is the angle at which the planar surface 2q, generating angle V1, is placed on the face of the die, measured at the intersection edge 2e in the plane of clearance surface 2j at the back of the dies, with respect to plane Q; slug contiguous axial separation control angle X1 being the angle between edge 2d and plane Q; converging point forming angle Y being the angle at which edge 2b in the plane surface 2n generating angle Z1 rises from the flat of the die face (between edges 2a and 2c) shown as surface 2m to the top of the rise, shown by surface 2r, along the edge 2b measured from the plane of the surface 2m in a plane perpendicular to plane P and including edge 2b with this angle defined on the shorter die 2 by the rise height HL and the distance between sections 5—5 and 7—7, or expressed in another way, angle Y being the angle between edge 2b and plane P measured in a plane having edge 2b and extending perpendicular to plane P; and reservoir and connecting portion surface generating angle Z1 forming this flat surface 2n between edges 2b and 2d which maintains a supply of material for forming the workpiece point 3y, as measured with respect to either the paralleled die surface 2m or plane P.

Die 2 also includes a plurality of surfaces including die side surface 2h located at the bottom of the die pocket; body portion thread forming, generally planar surface 2m located generally parallel to the longitudinal reference plane P and having threads 2t thereon for forming threads on the cylindrical workpiece body portion 3x with surface 2m forming the minor diameter of the threaded portion of the workpiece with portion 3x shown as this minor diameter; a point forming and thread rolling, generally planar surface 2p divergingly extending in the advancing direction S2 for at least a portion of its length, located at edge 2c of the thread forming surface 2m, and inclined therefrom toward the longitudinal reference plane P with said surface 2p including a first zone, including edge 2b, extending toward the left from section line 5—5 in FIG. 3, as it would appear in FIG. 1, for forming point 3y with this surface 2p increasing in width in the advancing direction to its left end and a second zone, overlapping the first zone, having threads 2t thereon for applying threads to the finished point 3y after the formation of each portion thereof; a reservoir and connecting portion forming surface 2n, generally planar in form, converging toward the longitudinal reference plane P in the advancing direction S2 from the body thread forming surface 2m located at the same edge thereof as the point forming and thread rolling surface 2p at approximately the beginning of this surface 2p, and tapering in a converging direction to a point at the fully formed point zone on section line 7—7; a slug movement controlling surface for controlling the force of slug separation movement relative to body portion 3x with this surface divided into a first portion 2q and a second portion 2s to be described in more detail at a later point in the specification; slug movement controlling surface portion 2q being generally planar, being axially aligned with the reservoir and connecting portion forming surface 2n, and extending in the advancing direction S2 to the fully formed point zone determined by section line 7—7; and serrations 2w in FIG. 2 on some of these surfaces, including surface 2n, extending generally parallel to the rotational axis 3g of the workpiece, spaced along the advancing direction S2, and extending generally perpendicular to the transverse plane Q. "Generally parallel" and "generally perpendicular," as used herein, includes the serrations on surface 2m being perpendicular to plane Q and the serrations on surface 2n being perpendicular to edge 2d (see FIG. 17 for illustration of maximum variation) so as to be approximately perpendicular to plane Q. However, the serrations on surface 2n may extend exactly perpendicular to plane Q, instead, if so desired.

The first, second and third forms of the invention have corresponding die structure, dimensions and angles, and these provide generically the same mode of operation. Dies 1, 2, 4, 5, 7 and 8 correspond; workpieces 3, 6 and 9 corresponds; edges 1a, 2a, 4a, 5a, 7a and 8a correspond; edges 1b, 2b 4b, 5b 7b and 8b correspond; edges 1c, 2c, 4c, 5c, 7c and 8c correspond; edges 1d, 2d, 4d, 5d, 7d and 8d correspond; edges 1e, 2e, 4e, 5e, 7e and 8e correspond. Dimensions A, B, C, D and F correspond; and angles T and Y correspond in each form. Directions R1, R4 and R7 correspond; directions S2, S5 and S8 correspond; directions S1, S4 and S7 correspond; angles V1, V2 and V3 correspond; angles W1, W2 and W3 correspond; angles X1, X2 and X3 correspond; and angles Z1, Z2 and Z3 correspond. Surfaces 1h, 2h, 4h, 5h, 7h and 8h correspond; surfaces 1j, 2j, 4j, 5j 7j and 8j correspond; surfaces 1m, 2m, 4m, 5m, 7m and 8m correspond; threads 1t, 2t, 4t, 5t, 7t and 8t correspond; surfaces 1n, 2n, 4n 5n, 7n and 8n correspond; surfaces 1p, 2p, 4p, 5p, 7p and 8p correspond. Surface portions 1q, 2q, 4q, 5q, 7q and 8q correspond; and serrations 1w, 2w, 4w, 5w, 7w and 8w correspond. Although these threads and serrations are not shown on the blanks in FIGS. 3–8, 11–16, and 19–23, their location on the surfaces are shown by dot-dash lead lines.

Generic point forming mode of operation

Each of the three forms have the same generic mode of operation and follow the same theory of operation described for FIGS. 1–8. As die 1 in FIG. 2 moves toward the left in the direction of the arrow R1 thereon, the workpiece forming operation takes place. A minimum of one pitch circumference of roll, as shown by dimension B on die 2 in FIG. 3, is allowed during the starting and gripping portion of the operation terminating in the FIG. 5 relationship during which the workpiece is allowed to become firmly seated between the dies 1 and 2 while being grasped by the thread forms 1t and 2t and the starting serrations 1w and 2w on the dies. In FIG. 4, the workpiece is grasped along surfaces 1m and 2m extending between edges 1a and 1c and between edges 2a and 2c with clearance C between the workpiece and dies below edges 1c and 2c being provided by the distance D between the die surfaces 1n and 2n at that point. The workpiece forming operation starts at the moment that the distance D between the dies equals the workpiece diameter in FIG. 5 with the clearance C becoming zero. At this moment, the workpiece is grasped by the dies on surfaces 1m and 2m from edges 1a and 2a to edges 1b and 2b respectively, as shown in FIG. 5. FIG. 6 shows the action of the dies at a point part way through the point forming operation with the distance D between the dies having become closer than in FIG. 5. Edges 1b and 2b, which had started immediately after the FIG. 5 position at edges 1c and 2c respectively, are progressing toward each other and downwardly along the rotational axis 3g from edges 1c and 2c toward their ultimate position at edges 1d and 2d respectively in FIG. 7 at the completion of the point forming operation. Then, angle T is in the process of forming the workpiece point 3y, and the material, which has become displaced by the surfaces 1p, 2p, 1n and 2n extending between edges 1c, 1d, and 2c, 2d respectively, is forced to flow between the dies between edges 1d and 2d. As the workpiece rolls from FIG. 5 to FIG. 7, the distance D becomes progressively smaller and edges 1b and 2b move progressively toward edges 1d and 2d, the workpiece point 3y becomes more and more fully formed, and the entire action continues until FIG. 7 is reached at which time distance D has become a minimum and the point has become fully formed. It has been found in practice that satisfactory results will be obtained when distance D become 0.0005 inch. Now, the relative movement of the dies has formed a fully formed point 3y in FIG. 7 by downward extrusion of at least a portion of the extrudable portion 3z of the workpiece into slug 3w.

It should be noted that the surfaces 1n and 2n in this die design require a greater displacement of material in forming the point 3x than if they were omitted, as in another type die construction shown in FIG. 6A forming no part of the present invention but corresponding to FIG. 6. A greater amount of work must be performed on rolled workpiece in FIG. 6 and in FIG. 6A because the annular zone 10, bounded on its inner edge by the dot-dash lines in FIG. 6A corresponding to the workpiece outline in FIG. 6, must also be displaced in FIG. 6. To assure that this increase in work does not cause the workpiece to stall during the forming operation, serrations 1w and 2w are placed on the dies 1 and 2 respectively for frictionally engaging the surface of the workpiece 3 and positively rotating this workpiece about its longitudinal axis of rotation 3g during the relative die movement.

Threads are rolled upon the periphery of body portion 3x during the travel of the workpiece 3 along the full length of die 2, if so desired, and are rolled by threads 1t and 2w upon the point 3y in the second zone of the point forming surfaces 1p and 2p after edges 1b and 2b complete the formation of point 3y.

The extrusion action and theory thereof is especially important to assure that the point 3y on the finished product be fully formed and sharp. This is done by assuring that at least sufficient material, and perhaps an excess of material, is presented to the dies during the entire point forming operation to form a sharp and full point. This practice is predicated on maintaining the mass of material in the workpiece intact, or at least reservoir 3v intact with point [3g,] *3y* during the point forming cycle from FIG. 5 through FIG. 6 to FIG. 7 so that the plastic deformation necessary to form the point 3y takes place without any severing of the material by assuring that at least the reservoir 3v, and preferably the whole slug 3w, of the extrudable portion 3z does not axially separate downwardly from the partially finished product in FIG. 6, for example. This is accomplished by: (a) assuring that removal of the excess material during extrusion formation of point 3y does not exert a force greater than the rupture force of the material on the product being formed, and especially does not exert this rupture force in such a manner as to axially separate reservoir 3v from body portion 3x, so that there will be always sufficient material to form the extreme full point desired; and (b) assuring that the displaced material can flow in a generally axial direction relatively unimpeded along the surface of the dies and preferably forming the slug 3w down below the end of the full sharp point 3y in FIG. 7 by flowing from the partially formed point 3y in FIG. 6 through the reservoir 3v along the surfaces of the dies. This relatively unimpeded character of the flow is assured by minimizing the number of thread forms on the dies between edges 2b and 2d in FIG. 1 while the serrations extending between these edges on surface 2n in a direction parallel to the axis of rotation 3g direct the flow in an axial direction in addition to frictionally engaging the workpiece against slippage.

The flat and tapered (in the advancing direction toward plane P) reservoir and connecting portion forming surfaces 1n and 2n between edges 1b, 1d and 2b, 2d (1) causes greater material displacement than the die set design in FIG. 6A and causes material displacement in sufficient quantity to move downwardly along workpiece axis 3g at a sufficient axial rate to preclude any rupture force being exerted by the dies on the slug 3w of excess material and (2) carries on the partially formed point 3y an adequate volume, or excess of material, in reservoir 3v through to the completion of the formation of the point in FIG. 7. It should be apparent that if condition (1) is met, then condition (2) will be met. This reservoir 3v is defined as being always of sufficient volume to complete the point formation. This material axial displacement rate is directly proportional to the volume or quantity of the displaced material flowing and is inversely proportional to the cross sectional area of the workpiece flow section. These are the two basic and important factors in point extrusion in all forms of the invention. This extrusion action removes excess material from the workpiece 3 by extrusion of the extrudable portion 3z into a slug 3w through connecting portion 3t at a sufficient rate during point formation while providing for retaining during the point forming operation sufficient material in reservoir 3v intact with the partially formed point 3y.

This reservoir 3v is located axially between slug 3w and the partially formed point 3y and is of sufficient volume to form a full, sharp point by extrusion. This connecting portion 3t, containing reservoir 3v, and formed by generally planar surfaces 1n and 2n, has a peripheral surface approximately generated by a line rotatable about the longitudinal axis 3g of the workpiece with this generating line coplanar with the axis. Surfaces 1n and 2n intersect a diametrical plane (in the plane of FIG. 6, for example), extending coplanar with workpiece axis 3g and perpendicular to reference plane P, along a line forming an angle in the three forms of the invention between 0 and 20 degrees with reference plane P, as shown respectively in FIGS. 6, 14 and 22 by angles Z1, Z2 and Z3. Connecting portion 3t, containing reservoir 3v, decreases uniformly in axial length and transverse or diametrical dimension as the point 3y is formed during this advancing relative movement of the dies and workpiece.

The dies are designed so that they do not exert a material rupturing separation force to separate the reservoir 3v from the partially formed point. The angle W1 [controls] *may determine* by slug movement controlling surfaces 1q and 2q the force for axial separation movement on said slug relative to said body portion 3x during advancing movement with the greater the angle W1, the greater the axial force component exerted on slug 3w. Clearance surfaces 1j and 2j are parallel to longitudinal reference plane P so that the surface 2q intersects plane P at the same angle W1 measured relative to transverse reference plane Q to determine this axial separation movement force. This angle W1 and FIG. 3, and W2 and W3 in FIGS. 11 and 19, will give satisfactory results if it is an angle of 0° to 14° diverging from transverse reference plane Q in the advancing direction.

It should be noted that angle X1, determined by the intersection of surfaces 2n and 2q forming edge 2d and by plane Q, is also related to angle W1. Since surface 2n is not parallel to plane P but is inclined, as shown by angle Y in FIG. 2 determining edge 2b in surface 2n, with respect to reference plane P, angle X3 will always be equal to, as shown in FIG. 19, or less than angle W1, as shown by angles X1 and X2 in FIGS. 3 and 11, so will form an angle between 0 and 14 degrees diverging from transverse reference plane Q in the axis advancing direction S2.

This slug movement controlling surface 2q forms an angle between 20 and 90 degrees with reference plane P and workpiece axis 3g, as shown by angles V1, V2 and V3 in FIGS. 6, 14 and 22.

The shape and inclination of surface 2n also has an effect upon the slug pop-off action, but it has been chosen to hold the angle Z1 thereof in the three invention forms within a range of 0 to 20 degrees, as shown by angles Z1, Z2 and Z3, so as not to be critical, as will be brought out in more detail hereinafter.

This excess material removal action by extrusion without exerting a material rupturing separation force to separate the reservoir 3v from the partially formed point may be approached from a different point of view. Edges 1b and 2b form a point on the workpiece by extrusion at one rate during the advancing movement of the dies and workpiece while surfaces 1q and 2q, along with their edges 1d and 2d, control the force for the axial separation movement of the slug 3w downwardly relative to body portion 3x during this advancing movement at a different rate. This second rate may be slower than the first rate, as shown by the smaller inclination of edge 2d than of edge 2b in FIG. 3, so that the force exerted by this second rate and surfaces 1q and 2q is not greater than the rupture force of the material while the point 3y may be formed rapidly by edge 2b at the faster first rate independent of the second rate, which has a design controlled by slug rupture force. Hence, the rate of point formation and the axial force on the slug are not directly related as they are in the FIG. 6A design wherein premature pop-off of the slug may occur if the point formation is too rapid because both the point forming edge and slug separation surface are coplanar. In the FIG. 3 design, edge 2b may form the point 3y at its own rate while the inclination angle W1 of the surface 2q is related to the axial rate of material extrusion. As long as the material is being displaced axially in sufficient quantity downwardly along axis 3q at a sufficient axial rate so that it is traveling axially as fast as surfaces 1q and 2q, these surfaces cannot exert a rupturing force on the slug 3w. It should be noted that these surfaces may even advance more rapidly than the slug as long as the rupture strength is not exceeded before FIG. 7 is reached. This control of the force for axial separation movement of the slug at the second rate is determined by the orientation of the first portions 1q and 2q of the slug movement controlling surface as it is oriented in the advancing direction relative to the workpiece axis 3g by angles W1.

Note that the serrations 1w and 2w extend generally axially along the reservoir and connecting portion forming surfaces 1n and 2n between edges 1b, 1d and 2b, 2d to minimize flow impedance, and hence to direct the extrusion flow of the material in the axial direction, as well as to frictionally engage the workpiece to assure positive rotation.

It has also been found in practice that if premature pop-off of slug 3w does occur for any reason, whether accidentally or intentionally induced (such as by improper usage of the dies), before the point is fully formed, the design of the dies assures that the pop-off will occur axially between the connecting portion forming edges, such as edges 1b, 2b and 1d, 2d in FIG. 6, in each of the three invention forms illustrated with sufficient material still connected to the workpiece body portion 3x in FIG. 6 to provide the reservoir 3v in FIG. 6 of adequate volume for point formation completion.

Point forming in FIGS. 1–8

Up to this point, we have described generically the structure and mode of operation of each of the three disclosed forms of the invention in FIGS. 1–8, in FIGS. 9–16, and in FIGS. 17–24. Now, the differences will be emphasized as they relate to the point forming and the control of the force for slug separation during extrusion.

In the first form of the invention in FIGS. 1–8, angles X1 and Z1 each equal zero to assure large material displacement and to assure sufficient material in reservoir 3v if for any reason premature pop-off occurs. Also, the aforementioned line generating the peripheral surface of the connecting portion 3t by surfaces 1n and 2n extends parallel to the workpiece rotational axis 3g and plane P as shown by angle Z1 equal to zero, edges 1d and 2d are oriented along a path of travel parallel to plane Q and extending transverse to axis 3g in the advancing direction, slug movement controlling surface first portions 1q and 2q each form an angle V1 greater than 20 but less than 90 degrees with plane P and workpiece axis 3g. Angle W1 is between 0 and 14 degrees.

With this construction, it is apparent that the large quantity of material displaced will cause the material to be extruded axially downwardly between the die edges 1d and 2d in such quantities and at such an axially downward rate as to preclude any contact of the slug 3w with any of the slug movement controlling surface portions 1q and 2q created by angles V1 within their limits of 20 degrees to 90 degrees. This fulfills the requirement that not sufficient axial component of force can be created on the slug 3w to create a rupture force for separation of reservoir 3v from body portion 3x.

Adequate material is assured to form full point 3y for another reason. It can also be seen that with angle X1 equal to zero, edges 1d and 2d in FIGS. 4 to 7 inclusive always maintain themselves at a distance A, the nominal thread length, away from the top edges 1a and 2a of the dies. If premature severance is to occur, it will occur approximately in the plane of edges 1d and 2d so that adequate material always remains to form full point 3y.

These structural relationships fulfill the requirement that (1) at least sufficient, if not an excess of, material is always present, since angle X1 equals zero, between the dies at the point up to the time of achieving the full, sharp point in FIG. 7 even if premature severance should occur, and (2) since material is being constantly extruded at a sufficient rate axially downwardly past edges 1d and 2d during the point formation by relative die movement in the advancing direction, the component of axial downward force caused by the slug movement controlling surface portion 1q and 2q will be less than the rupture force of the material so that there will be no tendency to cause premature pop-off of the slug 3w as might occur in the FIG. 6A design.

Point forming in FIGS. 9–16 and in FIGS. 17–24

Before the second and third forms of the invention in FIGS. 9–16 and FIGS. 17–24 respectively are described in detail, some introductory factors should be considered. In each of the three disclosed forms of the invention, the work necessary to be applied to the workpiece material to cause the plastic deformation of the material to form the point is derived from the rotation given the workpiece by the relative die movement in the advancing direction. The transfer of this motion from the dies to the workpiece is made by means of the frictional force established along the line of contact between the dies and workpiece and by the serrations 1w and 2w in FIGS. 1–8, 4w and 5w in FIGS. 9–16 and 7w and 8w in FIGS. 17–24. In the first form of the invention in FIGS. 1–8, wherein angles X1 and Z1 each equal zero, a comparison of FIGS. 6 and 6A will reveal that a larger amount of material displacement is required in FIG. 6 than in FIG. 6A, and hence, a proportional increase in the amount of work must be performed with the FIG. 6 construction. However, although the first form of the invention works satisfactorily with many types of workpieces, and especially the ones having longer axial length, difficulties are encountered with workpieces having shorter axial length because there is not sufficient axial contact between the dies and workpiece for the dies to always positively rotate the workpiece so slippage occurs. The second and third forms of the invention have been developed to reduce the amount of workpiece material displacement, and hence the amount of work required to form the point. Hence, workpieces having a smaller axial length of contact with the dies can be satisfactorily rolled with the second and third form of the invention while slippage would occur with the first form of the invention so that an imperfect product would result.

The first variation from the first form of the invention involved a change in angle Z1. This variation increases the angle Z1 from zero degrees in FIGS. 1–8 to an angle greater than zero but less than 20 degrees with plane P, as shown by angle Z2 in FIGS. 9–16 and angle Z3 in FIGS. 17–24. This variation not only reduces the amount of material displacement but also decreases the amount of work necessary to be applied to the workpiece during the point forming operation and during the excess material severing operation, which latter operation will be described in more detail hereinafter. The primary purpose of the first variation is to present a sharper angle for easy penetration of the workpiece with less work required. However, a slight decrease in the displaced volume of workpiece material is also achieved. Compare FIG. 14 or 22 with FIG. 6. The practical limits of angles Z1, Z2 and Z3 are from zero degrees through 20 degrees. Beyond 20 degrees, the axial downward component of force on the slug 3w between edges 4b and 4d, 5b and 5d, and between edges 7b and 7d, and 8b and 8d becomes a factor to cause severing of the slug prematurely. The range of zero to 20 degrees is a [comprise] *compromise* to stay within the rupture strength of the material. It should be noted that in the second and third forms of the invention, the slugs 6w and 9w have a smaller velocity or rate of travel axially downwardly away from die edges 4a, 5a or 7a, 8a, as angles Z2 and Z3 increase above the zero degrees of angle Z1 because: (1) the downwardly displaced material volume is reduced between edges 4d, 5d and 7d, 8d, and (2) the cross sectional area of the workpiece between edges 4d, 5d, and edges 7d, 8d has been increased.

This first variation is incorporated in both the second and third forms of the invention disclosed respectively in FIGS. 9–16 and FIGS. 17–24. In these forms of the invention, the aforementioned generating line for the peripheral surface of the connecting portions 6t and 9t is angularly related between zero degrees and 20 degrees to the axis 6g and 9g of body portion rotation respectaively, as shown by angles Z2 and Z3, with the reservoir and connecting portion forming surface portions 4n, 5n and 7n, 8n extending non-parallel to the longitudinal reference plane P within an inclination of zero to 20 degrees with respect thereto in the plane of the axis 6g and 9g of body portion rotation respectively.

The second variation of the first form is provided by increasing angle W1. Then, the angles of the X series may be greater than the zero degrees of angle X1, as shown by the angles X2 and X3 in the second and third forms with each greater than zero degrees. This causes in the second and third invention forms the edges 4d, 5d and 7d, 8d, as seen in FIGS. 14 and 22 respectively, to move closer to the edges 4a, 5a and 7a, 8a than the nominal thread length distance A at the start end of edges 4d, 5d and 7d, 8d, while these corresponding edges 1d and 2d in the first form always remain at distance A. Therefore, the displaced volume of workpiece material is thereby decreased. The premise that the slug 6w or 9w should not have any force exerted thereon tending to exert a rupture force on the workpiece is opposed by two adverse factors existing when angles W2 and W3 are increased: (1) by reducing the displaced volume, less material is displaced in FIGS. 14 and 22 than in FIG. 6 and therefore less material is flowing downwardly past edges 4d, 5d and 7d, 8d in these drawing figures so that the slugs 6w and 9w has less velocity or downward axial travel rate away from top die edges 4a, 5a and 7a, 8a in the attempt to escape contact with the slug movement controlling surface portions 4q, 5q and 7q, 8q; and (2) these surfaces are inclined in advancing directions S4, S5 and S7, S8 away from the transverse reference plane Q at a steeper angle than surface 1q and 2q, as shown by comparing angles W2 and W3 with angle W1, and are therefore moving away with a greater velocity or axial rate of travel from top die edges 4a, 5a and 7a, 8a toward the slugs 6w and 9w than surfaces 1q and 2q. The limit to which this reduction of material displacement can be taken varies with these last two mentioned adverse factors and occurs when angles W2 or W3 is increased to the inclination where the pressure from slug movement controlling surface portions 4q, 5q or 7q, 8q causes the slug 6w or 9w to have a force exerted thereon exceeding the rupture strength of the material so that the danger of severing exists. The value of the maximum angle W2 or W3 changes as the workpiece 6 or 9 advances during the point forming operation because this material axial displacement rate is directly proportional to the material flowing and is inversely proportional to the workpiece cross sectional area of the workpiece flow section with this area decreasing in the advancing direction. Also, the value is different from one size die to another, and is different from one rolled workpiece or product to another.

This second variation is disclosed in the structure in the second and third forms of the invention in FIGS. 9–16 and FIGS. 17–24 respectively. In each of these forms, the slug movement controlling surface portions 4q and 5q or 7q and 8q at its intersection with the longitudinal reference plane P is angularly related to the transverse reference plane Q as angle W2 or W3 within a range of zero degrees to 14 degrees by diverging from plane Q in the axis advancing direction and the edges 4d and 5d or 7d and 8d advance axially away or diverge from the workpiece body portion 6x or 9x and the transverse reference plane Q in the axis advancing direction. Each of these edges form an angle X2 or X3 greater than zero and less than 14 degrees with this transverse reference plane Q.

The third variation from the first form relates to changing angle V1 or V2 to a 90 degree angle, as shown by angle V3 in FIG. 22. It has been found that this design permits the greatest movement of the points on edges 7d and 8d away from top die edges 7a and 8a toward distance A during advancing movement of the workpiece with safety and thus provides the greatest reduction in mamaterial displacement for a given size of angle W3. Hence, this design requires minimum work to be expended in forming the workpiece and provides minimum material displacement for a given axial separation control angle W3. This variation carried the relationship between angles in the second variation mentioned heretofore to its most effective point with the necessary resulting alterations of other design features to allow it to occur. Study will show that angle X3 is the resultant of the intersection of the planar reservoir and connecting portion forming surface 8n with the slug movement controlling surface portions 8q. This latter surface 8q is also established by angle W3. Thus, holding angles Z3 and V3 constant, angle X3 varies with angle W3. Further study will show that the greater is the angle V3 the closer angle X3 comes to angle W3 and conversely, the shallower angle V3 is, the greater is the difference between angles X3 and W3. Although the second variation is in terms of changing angle W3, it is actually angle X3 which established the amount of material displacement and not angle W3. The larger the angle X3, the smaller the material displacement. Hence, the amount of material flowing axially downwardly past edges 7d and 8d, which establishes the velocity with which slug 9w moves axially downwardly, is dependent on angle X3 instead of angle W3. The other factor involved, as mentioned before, in whether the planar surface portions 7q and 8q having angles V3 exert a rupturing force on the reservoir 9v of workpiece 9 between edges 7b, 8b and 7d, 8d is determined by the rate at which these planar surfaces 7q and 8q move away from top die edges 7a and 8a with that rate determined by angles W3. For a given rate of material displacement, determined by angles X3, the greater angles W3 become, the greater is the tendency for surfaces 7q and 8q to exert a rupturing force on the workpiece 9. Hence, for a given amount of material displacement, determined by angles X3, the best values for angles W3 exists when these angles are reduced to the same value as angles X3. This condition exists when angles V3 each equal 90 degrees. Thus, to make the aforementioned second variation most effective, angles V3 are set at 90 degrees. Then, the greatest separation movement of edges 7d and 8d and surfaces 7q and 8q from top die edges 7a and 8a toward dimension A can be safely made and thereby the greatest reduction in material displacement is possible. Then, we have the optimum condition of minimum work required to extrude the workpiece, minimum displacement of workpiece material during extrusion, and minimum pull-off force being exerted on the slug 9w.

This third variation is disclosed in the third form of the invention in FIGS. 17–24 wherein the slug movement controlling surface portions 7q and 8q form an angle V3 of 90 degrees with plane P and workpiece axis 9g, instead of, as in the first and second form of the invention, having angles V1 and V2 each angularly related at least 20 degrees but less than 90 degrees to the rotational axis 9g of the workpiece and the longitudinal reference plane P.

Each of these three aforedescribed variations have been mentioned separately and each may be used alone, if so desired, but also may be used in combinations of any two thereof, as shown by the second form of the invention or in a combination of all three thereof, as shown in the third form of the invention. The practical range of the angles disclosed herein to secure desirable results are briefly summarized as follows: the angles of the W group may range between zero and 14 degrees, as shown by angles W1, W2 and W3; the angles of the V group may range between 20 and 90 degrees, as shown by angles V1, V2 and V3 with angle V3 being 90 degrees; the angles of the X group may range between zero and 14 degrees, as shown by angles X1, X2 and X3 with angle X1 being zero degrees; and the angles of the Z group may range between zero and 20 degrees, as shown by angles Z1, Z2 and Z3 with angle Z1 being zero degrees. The three illustrated forms are only examples to illustrate the invention and it should be understood that a die pair may have its corresponding angles V, W, X and Z anywhere within the aforementioned ranges to give satisfactory thread rolling results.

Introduction to generic excess material severance

Now the excess metal existing beyond the sharp point must be removed by severing or cutting off so as to make a perfect product. This excess metal takes the form of a slug 3w in FIGS. 7 and 26, 6w in FIG. 15, and 9w in FIG. 23 connected to the product point 3y, 6y or 9y respectively by an extending or connecting portion 3ts, 6ts or 9ts extremely thin in cross section attached to the respective points. A new reference numeral has been used with this connecting or attaching portion at and after FIGS. 7, 15 and 23 because the connecting portion no longer has a reservoir, such as reservoir 3v, the point is fully formed and the attaching or connecting portion provided another function and operates in an entirely different manner during the severing operation. Since the slugs 3w, 6w and 9w in FIGS. 7, 15 and 23 are large in size and have most of the material therein of the extrudable portion beyond the point, they may break off cleanly at the tips of the points by the forces involved at FIGS. 7, 15 and 23 without requiring the hereinafter disclosed severance action. However, in the manufacturing operations wherein the excess metal will not break off cleanly, and provide a full, sharp point, so that excess metal or a pigtail persists, then the severing action in FIGS. 7, 8, 15, 16 and 23–28 may be required.

It should be readily apparent that this severing action structure therefor can be used on other type dies and apparatus for removing excess material in addition to the point forming and thread rolling die construction described in detail heretofore.

Here, this severing action removes any excess material which may exist beyond the extreme point once this point has been fully formed. The principles upon which the severing action is based are: (a) to design the rises or extrusion surfaces of the dies to pass one another at their closest point with little clearance at and beyond FIG. 7 so as to extrude the excess material and to extend connecting or extending portions 3ts; (b) to establish a wedge form at the proper point in the product forming operation, such as the wedge provided by surface portion 2s, beginning at or beyond the section in FIG. 7, to force the excess material away from the established point 3y; (c) to offset the center of rotation of any pigtail or excess material 3ts from the center of rotation of the body portion 3x of the workpieces or product 3 to thus cause extreme cold working and probably severing of the excess material; (d) to provide a barrier, here shown as notch 2v, in the path of advance of the excess material to wipe it off as the workpiece advances; and or (e) to combine the offset center of rotation of (c) with the barrier of (d) to sever any remaining excess material 3ts extending beyond the end of the product point. Of course, if portion 3ts is removed, and slug 3w is attached thereto, slug 3w will also be removed, but it should be noticed that aforementioned items (a), (c), (d) and (e) will work equally well with or without slug 3w attached to portion 3ts.

Generic excess material severance structure

The structure of the severance means is located on the dies at and in the advancing direction after FIGS. 7, 15 and 23 respectively in the first, second and third forms, i.e., at and toward the left of section lines 7—7 in FIG. 3, 15—15 in FIG. 11, and 23—23 in FIG. 19.

Only the structure for the first form in FIGS. 1–8 and 25–28 will be described in detail but the structural components thereof are generic to the other forms of the invention. The dies 1 and 2 respectively have edges 1f and 2f, being the intersection edges between planar surfaces 1r, 1s and 2r, 2s and being the points of farthest contact from top edges 1a and 2a on the workpiece at and after it passes section 7—7 by advancing movement; edges 1d and 2d defining the points of contact measured from edges 1a and 2a by distance A therefrom with edges 1d and 2d located at and after section 7—7; generally planar excess material extrusion surfaces 1r and 2r extending generally parallel to or located in the longitudinal reference plane P in the advancing directions S1 and S2 away from the fully formed point zone in FIG. 7 at the converging end of the reservoir and connecting portion forming surfaces 1n and 2n whereat workpiece point 3y is fully formed; slug movement controlling surface second portions 1s and 2s extending from the fully formed point zone at FIG. 7 in the advancing directions S1 and S2 on these dies in a diverging or separating direction with respect to the transverse reference plane Q; and a notch or nick 2v in the short die 2 at the end of the extrusion surface 2r with die 2 having the larger rise height HL. The dies 1 and 2 also have certain dimensions indicated on the drawings including clearance D, being the clearance distance between surfaces 1r and 1s at and after FIG. 7; actual height of larger rise height HL (slightly larger than nominal rise height, which nominal rise height is obtained for any pair of dies by dividing the minor diameter of the rolled workpiece or product body portion 3x by two and subtracting clearance D/2 to obtain the rise height on each die for coaxial alignment of portion 3ts and body portion 3x) on the die carrying the larger rise height as part of the off-set rise principle and herein shown as short die 2 for illustration purposes only and with rise height HL being the distance between surfaces 2m and 2r measured in a plane parallel to plane Q; actual height of smaller rise height HS carried on the die with the shorter rise height, shown herein as die 1, as part of the off-set rise principle and with rise height HS being the distance between surfaces 1m and 1r measured in a plane parallel to plane Q; clearance distance J from the top of the rise on each die in FIG. 8 to the plane at the back of the dies near the lower edge thereof giving clearance for the slug 3w and with distance J being the distance between surfaces 1j, 1r or 2j, 2r, each extending parallel to plane P, measured in a plane parallel to plane Q; depth L of notch 2v; nominal thread length A required of the dies and shown on the drawings as the intersection of angle T with the horizontal reference plane P in FIGS. 7 and 8; actual thread length A1 on the die with the larger rise height HL, herein being die 2, located in the advancing direction at and after FIG. 7 and measured from plane Q; actual thread length AS on the die with the shorter rise heights HS, herein being die 1, located in the advancing direction at and after FIG. 7 and measured from plane Q; the length K of notch 2v measured in a plane parallel to reference plane P; and the lengthwise dimension M, measured parallel to plane P, of the relief at the end of the short die 2 curved convexly and away from longitudinal reference plane P in the advancing direction. Hence, it should be apparent that the extrusion surfaces 1r and 2r are located at different distances from the longitudinal reference plane P in which the axis of rotation 3g of the body portion 3x travels because of the difference in rise heights HL and HS; extrusion surface 2r is located closer to plane P, whether located in plane P or on either side of plane P, than extrusion surface 1r. Hence, it should be apparent that the sections straddling the workpiece 3 as it advances are generally similar at all times in a transverse plane (extending perpendicular to plane P and including the rotational axis 3g) except for the difference in rise height dimensions HL and HS and the existence of notch 2v only in die 2.

The first, second and third forms of the invention have corresponding die structure, dimensions and angles, and these provide generically the same mode of operation. The second and third forms of the invention in FIGS. 9, 10, 11, 15 and 16 and in FIGS. 17, 18, 19, 23 and 24 respectively have the same generic structure with connecting or extending portions 6ts and 9ts corresponding with portion 3ts; slugs 6w and 9w corresponding with slug 3w; edges 4f, 5f and 7f, 8f corresponding with edges 1f, 2f; edges 4d, 5d and 7d, 8d corresponding with edges 1d, 2d; extrusion surfaces 4r, 5r and 7r, 8r corresponding with extrusion surfaces 1r, 2r; directions S4, S5 and S7, S8 corresponding with directions S1, S2; slug movement controlling surface second portions 4s, 5s and 7s, 8s corresponding with the surface portions 1s, 2s; and notches 5v and 8v corresponding with notch 2v. Also, dimensions A, D, HL, HS, J, K, L, AL, AS, and M correspond in each of the three forms.

Specific excess material severance structure in FIGS. 1–24

However, the three forms of the invention do have some structural differences. In the first and second form of the invention, each slug movement controlling surface includes a first portion 1q, 2q, 4q or 5q and includes a second portion 1s, 2s, 4s or 5s on respective dies 1, 2, 4 or 5. On any one die, the first and second portions of this surface are coplanar, such as portions 2q and 2s in FIG. 3, and are formed of a planar surface having an inclination measured by the angles W1, V1 or W2, V2. However, in the third form of the invention, wherein angle V3 is 90 degrees, both the first portions 7q, 8q and the second portions 7s, 8s of the slug movement controlling surface are formed by the same cutter with the latter portions formed by the run-out of the cutter in FIG. 19 having a radius dimension G to provide the same wedging action in the advancing directions, as obtained by angle W1 or W2 in the first or second form of the invention, with this same cutter being used for machining angles W3 and X3 since the axis of rotation of the cutter is parallel with the transverse reference plane Q.

For any one of the three forms of the invention, all dimensions, angles, surfaces and edges on the long and short dies remain the same during simultaneous workpiece contact. However, in each die pair, the two dies thereof differ in the rise height HL and HS, the thread lengths A1 and AS, and the nicks or notches 2v, 5v and 8v on dies with rise HL (these nicks not being disclosed on the longer dies).

In the event that any material persists at the end of the product at or beyond the FIG. 7, 15 or 23, or in the event that manufacturer using the dies employs the practice of placing the finishing end of the dies closer together than the start end to thus continually cause extrusion to the very end of workpiece travel, excess material and pigtail removal devices are included as an integral part of the dies.

Generic excess material severance mode of operation

Four different types of excess material or pigtail removal, severance or cut-off are provided working individually, in series or simultaneously. Three or four different possible workpiece positions are shown in dot-dash lines in FIGS. 25 and 26. In FIGS. 25 and 28, portion 3ts is shown respectively below surface 2r and to the right of plane P in dot-dash lines to show the position of portion 3ts relative to the workpiece body portion 3x caused by surfaces 1r and 2r at a workpiece position one-half workpiece rotation earlier in the advancing direction S2.

First, the extrusion surfaces 1r and 2r located at and beyond section 7—7, have a clearance D between them as small as possible. It has been found that the clearance may be reduced as small as 0.0005 inch to actual touching contact and may be increased to 0.011 inch. Then, these surfaces 1r and 2r will extrude a portion of the extrudable portion 3z of FIG. 4 beyond point 3y into a connecting or extending portion 3ts of thin cross section with or without a slug 3w located at its outer end with this extending or connecting portion 3ts approximately 0.011 inch in maximum transverse dimension or diameter D. Portion 3ts is formed at the section in FIG. 7 from connecting portion 3t. Then, the differential relative movement of the body portion 3x and this portion 3ts relative to the dies and the cold working of the thin cross section of work hardenable material will make portion 3ts so work hardened and so slender in section that it will probably sever from the point 3y.

Second, if the excess material still remains attached to the product or workpiece, a wedge may be employed to axially remove the slug 3w, and as much of the connecting portion 3ts as will sever, from the workpiece by exerting an axial force against the slug in the manner shown in FIG. 26. This occurs during the advancting movement S2 or S5 in FIG. 2 or 10. The apex of angle W1 or W2 is located at FIG. 7 or 15 respectively so that any slug 3w or 6w persisting beyond either FIG. 7 or 15 will be drawn either away from the body portion 3x or 6x of the rolled product by the side of the angle W1 or W2 by slug movement control surface second portions 1s, 2s or 4s, 5s. In FIG. 19 the same action is achieved through the use of the arcuate, tool run-out generated, slug movement controlling surface portions 7s and 8s. However, it should be apparent that severance or slug pop-off might also be caused to occur by having only one wedging surface, such as surface 1s or 2s, on one die instead of two on a pair of coacting dies, by exerting a bending action on the thin connecting portion 3ts to bend it away from said one die in a clearance gap on the other die.

Third, any excess material still adhering to the product point may be severed by periodically oscillating the extending or connecting portion 3ts until it serves by work hardening during advancing movement S2 of the workpiece. This principle of excess material oscillation relies upon the structure of the larger rise height HL being carried to, beyond, or at least closer to the axis of rotation 3g of the workpiece body portion 3x in plane P while the smaller rise height HS is decreased to allow the proper clearance D between the extrusion surfaces 1r and 2r, which surfaces are located at different distances from the longitudinal reference plane P in which body portion rotational axis 3g travels. In FIGS. 25, 27 and 28, it can be seen that the excess material in portion 3ts is always held in spaced relationship with the axis of rotation 3g. Rotation of the workpiece 3 relative to the dies 1 and 2 periodically oscillates portion 3ts transverse to this longitudinal axis of rotation 3g of the body portion 3x and relative to the body portion 3x to sever this extending portion 3ts by work hardening. The upper position of portion 3ts in the middle workpiece of FIG. 25 and its solid line position in FIG. 28 show positions in which this portion is forced by the die surfaces 1r and 2r into from the lower position in FIG. 25 and the dot-dash line position in FIG. 28 wherein it prefers to remain and had assumed relative to body portion 3x one-half rotation earlier in its travel. Hence, work hardening can cause severing of portion 3ts while the point 3y on the product is not affected. To assure a good product from the dies, the off-set rises are designed with the dimension F being held constant for a given pair of coacting dies. Then, larger thread length AL and smaller thread length AS are individually defined by angle T and larger rise dimension HL and smaller rise dimension HS. FIG. 28, being an enlargement of the portion encompassed by the circle in FIG. 27, shows the relative thread lengths A, A1 and AS with nominal thread length A being measured to a point where the side of angle T of the die carrying larger rise height HL intersects the body portion rotational axis 3g and plane P.

Fourth, notch or nick 2v is located at the end of extrusion surface 2r having the larger rise height dimension HL so as to wipe off any connecting or extending portion 3ts at the end of point 3y still remaining with this wiping off action taking place in response to the advancing movement of the workpiece in direction S2. This nick or notch 2v takes advantage of the tendency of the excess material in portion 3ts to always displace downwardly in FIG. 25 from the top of surface 2r having the larger rise height HL. The excess material will be displaced down the slope of the notch 2v by the off center relation between portion 3ts and axis 3g so that the excess material will be continually pressing downwardly until it is snapped off by the vertically extending left end of the notch 2v in FIG. 25 when the workpiece reaches the left-hand position in FIG. 25. This notch receives portion 3ts at one end of its oscillation to wipe it off of the product point in response to the advancing movement of the workpiece in direction S2.

This notch 2v has a theoretically best notch length dimension K in the advancing direction (toward the left in FIG. 25) from the left end of the extrusion surface 2r approximately equal to half a rotation of the body portion 3x. However, approximately one-half rotation is defined as including any satisfactory working dimension since it may work satisfactorily under some conditions if the length is greater than one-quarter rotation and substantially less than three-quarters of a rotation, or as any odd or even rotation multiple of one-quarter, one-half or three-quarters, such as one-half, one and one-half, two and one-half, etc., for example, in the half rotation series.

The notch 2v has a theoretical best depth dimension L at its left end. Then, depth dimension L is slightly greater than but not substantialy greater than dimension HL minus dimension HS. This difference between dimensions HL and HS determines a depth dimension located from the axis of body portion rotation 3g a distance equal to one-half the amplitude of oscillation of extending portion 3ts about axis 3g to permit portion 3ts to swing from the solid line to dot-dash line position in FIG. 28 and to seat in the bottom of notch 2v. The slight excess depth over the difference between the dimensions HL and HS permits the portion 3ts to fully seat but if the depth is substantially greater, the portion 3ts will be loose in notch 2v and the wiping off action will be hampered. However it has been found in practice that if this theoretical depth is extended to between approximately the limit 0.0005 to (HL minus HS +0.020) inch satisfactory operation will occur for the usual range of rise height dimensions HL and HS and the usual range of gimlet point screw sizes. Any appreciable nick will provide some wiping action but if the nick is too shallow and sufficient clearance exists between the dies to the left of the nick 2v in FIG. 25, portion 3ts may be deflected up and out of the nick 2v.

Notch or nick 2v has a theoretically best location to provide a superior product. Its downward slope, located at the right end of dimension K in FIG. 25, should be located at the end of the material periodically oscillating, extrusion surfaces 1r and 2r, the left end of nick or notch 2v should be located in alignment with the last thread form 2t in the advancing direction S2 short of the relief, shown as relief dimension M, at the left end of die 2 in FIG. 26 to provide maximum extrusion of portion 3ts to its thinnest cross section. Also, the left end of notch 2v in FIG. 26 should be located at the intersection of edge 2d with the last edge in the advancing direction S2 of the crest of this aforementioned last die thread 2t (root on the workpiece thread) located immediately to the right of notch 2v in FIG. 26 to provide a good sharp point 3y on the product. This product thread root is shown by the upper line in the group of three lines in FIG. 26 forming the thread form on the product.

Instead of a notch 2v depressed below the surface 2r, it should be readily apparent that any suitable barrier means may be used to intercept the travel of portions 3ts and wipe it off the product point by the relative advancing movement S2, and this barrier may be effective with or without the prior transverse oscillation of portion 3ts by the off-set rises.

Although the severance action has been described in detail with respect to the first form of the invention, it should be apparent that the corresponding structure in the second and third forms provides the same mode of operation.

Also, it should be readily apparent that any one of these four type excess material severing operations and structures may be used alone if satisfactory results are obtained, and any combination of two or three may be used instead of all four acting in series, as illustrated in each of the die pairs disclosed herein.

Also, it should be readily understood that the larger rise height dimension HL and notch 2v may be placed instead on the longer die 1 while the smaller rise heights HS appears on the shorter die 2 so that the dimensions and notch are interchanged on the dies but the mode of operation will still remain the same.

During this severing operation while the workpiece is traveling from section 7—7 toward the left in FIGS. 3 and 26, it should be readily apparent that the threads 1t and 2t continue to form and roll threads on the body portion 3x and/or point 3y, if desired.

Earlier in the disclosure, there were described two alternative forms of the apparatus wherein (1) axis 3g travels along a curved longitudinal surface instead of in plane P, and (2) axis 3g rotates, but does not move laterally, while the dies both move relative to stationary axis 3g in opposite directions. In these two alternative forms, it should be apparent that the surfaces P, 2m, 2n, 2p, 2q, 2r, and 2s may not be planar, as shown in the drawings, but may be cylindrical or of other curved form. The same comments apply not only to die 2 but also to all six dies 1, 2, 4, 5, 7 and 8.

Figure 10:
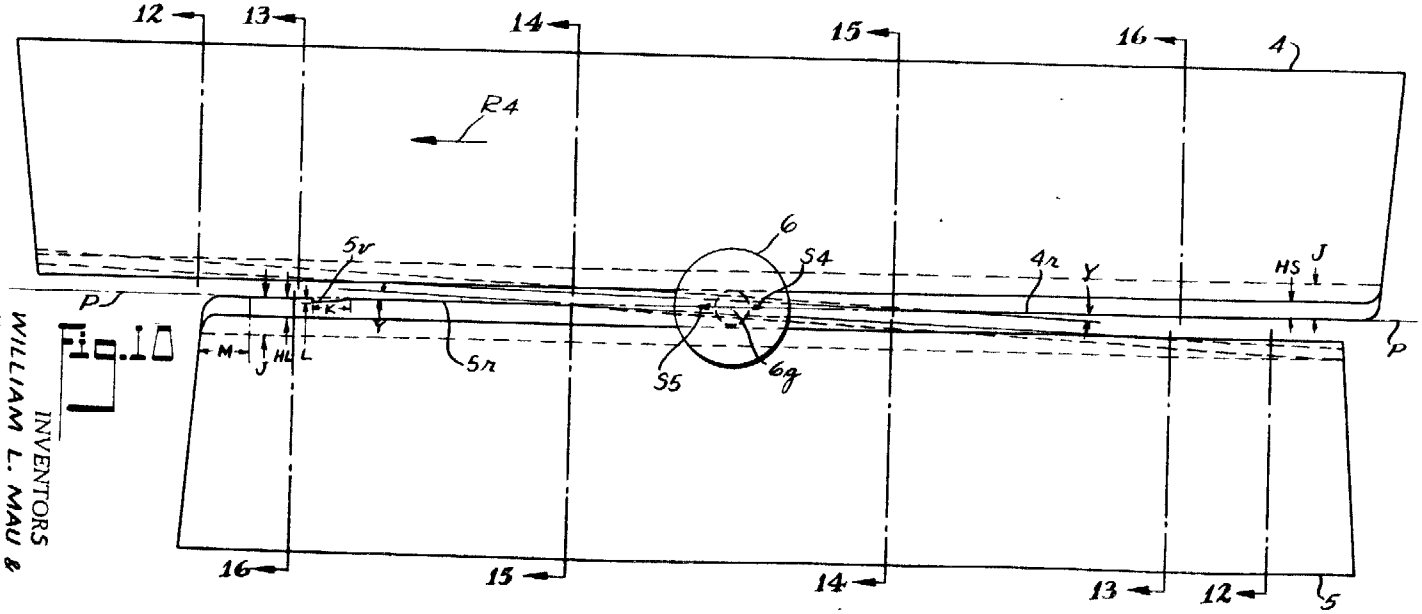
FIG. 10 is a top plan view of the two thread rolling dies of this platen die set adapted to roll threads upon a workpiece with the die of FIG. 9 being the short or lower die of the set but with these dies being shown as blanks, as in FIG. 2, without threads or serrations.
Figures 17, 18:
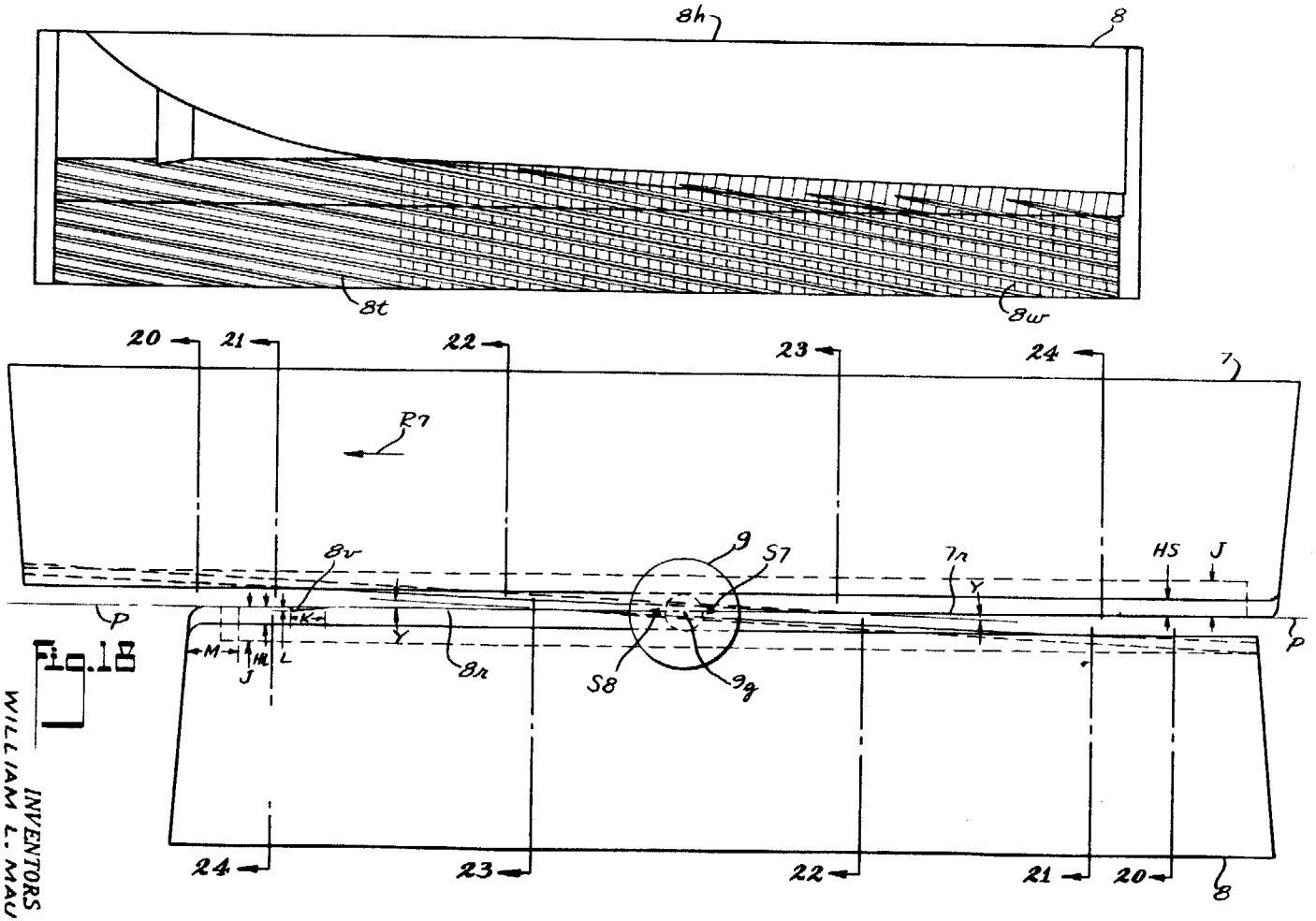
FIG. 17 is a side elevational view of the short die of a third form of thread rolling platen dies in the set disclosed in FIG. 18.
FIG. 18 is a top plan view of the two thread rolling dies of this platen die set adapted to roll threads upon a workpiece with the die of FIG. 17 being the short or lower die of the set but with these dies being shown as blanks, as in FIG. 2, without threads or serrations.

In each form of the invention, substantially identical workpiece engaging die sections are shown in the plane of the drawings in FIGS. 4, 5, 6, 7, 8, 12, 13, 14, 15, 16, 20, 21, 22, 23 or 24; and the extrusion surfaces 1r and 2r, 4r and 5, or 7r and 8r in FIG. 2, 10 or 18 are shown parallel to and nearly coplanar with reference plane P to give best results. However, it should be apparent that one die may be adjusted in the machine relative to its coacting die in the conventional manner along advancing direction R1, R4 or R7, or along the reverse thereof, for a limited distance to bring the sections out of substantially identical relationship in said drawing plane, and/or one or both dies may be inclined a limited angular amount relative to the horizontal in FIG. 2, 10 or 18 to so called "toe in" the dies at the workpiece finishing end so that distance D will decrease from FIG. 7 to 8, FIG. 15 to 16, or FIG. 23 to 24 to continually extrude portion 3ts, 6ts or 9ts as the workpiece advances instead of remaining constant, as in the aforegoing description and in the drawing. Also, the dies may be inclined in the opposite direction to be "toed out" so no extrusion take places by the extrusion surfaces, such as 1r and 2r. In each case, the dies will still coact properly to manufacture a good finished workpiece unless too great an adjustment or inclination has been made.

In the severing structure illustrated, surface 2r ends at nick 2v and surface 1r extends in advancing direction S1 as far as necessary to coact with surface 2r and nick 2v. However, if nick 2v is not used, surfaces 1r and 2r may extend to the ends of their respective dies, if so desired.

Suitable operative examples of each of the three invention forms are illustrated by coacting dies having any one of the following three dimensions and angles:

| | First | Second | Third |
|---|---|---|---|
| Dimensions: | | | |
| A | .527″+.000″−.015″ | .500″+.000″−.015″ | .500″+.000″−.015″. |
| B | .700″ | .700″ | .700″. |
| E | 2.850″ | 2.850″ | 2.850″. |
| F | .348″+.000″−.015″ | .330″+.000″−.015″ | .330″+.000″−.015″. |
| G | | | 6″. |
| HL | .065″ | .0645″−.0655″ | .0645″−.0655″. |
| HS | .065″ | .0595″−.0605″ | .0595″−.0605″. |
| J | .100″−.110″ | .125″ | .125″. |
| K | .235″ Approx | .235″Approx | .235″ Approx. |
| L | .010″ | .010″ | .010″. |
| AL | .527″ | .500″+.000″−.015″ | .500″+.000″−.015″. |
| AS | .527″ | .485″+.000″−.015″ | .485″+.000″−.015″. |
| Angles: | | | |
| | V1=60° | V2=30° | V3=90°. |
| | W1=1¾° | W2=5¾° | W3=2°. |
| | X1=0° | X2=2° | X3=2°. |
| | Z1=0° | Z2=10° | Z3=10°. |
| T | 20° | 20° | 20°. |
| Y | 1°53′ | 2°34′ | 2°34′. |

Dimensions for each of three dies.—Die workpiece contacting face dimensions (including relieved portion shown at M):

| | Inches |
|---|---|
| Short die length | 4¼ |
| Long die length | 5 |
| Width of each die | 1 |
| Thickness | 15/16 |
| Serrations: | |
| Distance between | 0.050 |
| Depth decreasing from— | |
| Start end (right end in FIG. 3) | 0.010 |
| to | |
| Section 7—7 in FIG. 3 | 0.003 |

wherein said workpiece contacting face length dimensions are constant for each size rolling machine or given die size, and wherein angle Y is constant for a given diameter workpiece and die face length.

Various changes in details and arrangement of parts may be made by one skilled in the art without departing from either the spirit of this invention or the scope of the appended claims.

What is claimed is:

1. In an apparatus, relatively movable dies for rotating about its longitudinal axis a cylindrical workpiece formed of extrudable and work-hardenable material having a cylindrical body portion and cylindrical extrudable portion for forming a pointed screw threaded product with a threaded body portion and threaded point by relative advancing movement between said dies and *the workpiece* axis providing an axis advancing direction relative to each die, *wherein said workpiece axis lies in a longitudinal reference plane midway between said dies,* said dies including thread rolling means responsive to relative die movement and operable during workpiece rotation for rolling *helical* threads [or other form] on said workpiece, extrusion means responsive to relative die movement and operable during workpiece rotation for forming a fully formed point on the workpiece by extrusion of at least a portion of said extrudable portion of the workpiece, *said thread rolling means including thread rolling means for rolling threads on said point and body portion simultaneously with formation of said point by said extrusion means,* said extrusion means including means for axially forming the point at a rate different from the axial advance of the helix, severance means responsive to relative die movement and operable during workpiece rotation for removing excess material existing beyond the fully formed point by extruding it into a slug and connecting portion thin in cross section attached to said point and connecting said slug and point, and means for frictionally engaging the surface of said workpiece and positively rotating said workpiece about its longitudinal axis during relative die movement, *said thread rolling means comprising on each die a body thread rolling surface for rolling helical thread on the cylindrical body portion of said workpiece having a side edge generally parallel to the direction of rolling of the workpiece, and a point threading surface having a first zone gradually increasing in width in the advancing direction from the beginning of said point threading surface to the end of said first zone for rolling threads on the tapered point as it is formed and a second zone for completing threading of the tapered point after it is formed, said point threading surface being inclined from said side edge of said body thread rolling surface toward said reference plane, said extrusion means being shaped to assure relatively unimpeded material flow from the partially formed point to said slug along surfaces of the dies and comprising on each die a triangular-shaped reservoir and connecting portion forming surface having an inner point forming side edge located at the outer side edge of said point threading surface and extending the full length of said first zone, an outer side edge, and a leading edge of initial workpiece contact extending from said inner edge to said outer edge, said reservoir and connecting portion forming surface being inclined from said point forming side edge away from said reference plane at an angle of from zero up to 20° and effecting material displacement at a sufficient axial rate to preclude any rupture force being exerted on the slug, each die being*

*shaped so that the cold working of the portions of the external cylindrical surface of the workpiece, which portions are axially outward of said side edge of said body thread rolling surface, is initiated at said leading edge substantially from the last-named side edge to said outer side edge of said reservoir surface, said inner and outer side edges of said reservoir surface gradually converging in the advancing direction toward the end of said first zone substantially from said leading edge, said means for positively rotating said workpiece comprising a series of regularly spaced lateral grooves extending across the reservoir and connecting portion forming surface for repeatedly engaging the workpiece at a series of circumferentially spaced locations throughout its circumference and for directing the flow of the extruded material generally in the axial direction.*

2. In an apparatus, relatively movable dies for rotating *about its axis* a cylindrical workpiece formed of extrudable material for forming a product with a body portion having a form rolled thereon and a *tapered* point by relative advancing movement between said dies and *the workpiece* axis providing an axis advancing direction relative to each die, *wherein said workpiece axis lies in a longitudinal reference surface midway between said dies,* said dies including form rolling means responsive to relative die movement for rolling a form on said workpiece, and extrusion means responsive to relative die movement for forming a *fully formed* point on the workpiece by extrusion of at least a portion of the workpiece, said form rolling means including means for rolling a form on said point and body portion simultaneously with formation of said point by said extrusion means *and comprising on each die a body form rolling surface and an inclined point rolling surface for rolling a form on the body portion and the tapered point, said point rolling surface having its inner side edge located at the side edge of said form rolling surface, being inclined from the latter surface toward said longitudinal reference surface and comprising a first zone gradually increasing in width in the advancing direction from the beginning to the end of said first zone for effecting form rolling during formation of said tapered point by said extrusion means and a second zone for completing the form rolling on the tapered point after such formation of said point, said extrusion means including on each die a reservoir and connecting portion forming surface having inner ad outer side edges converging in the axis advancing direction from spaced locations laterally adjacent the beginning of said first zone, the inner side edge of said last-mentioned surface providing a point forming edge located at the outer edge of said point rolling surface and extending from the beginning to the end of said first zone, said point forming edge providing the deepest penetration into said workpiece during extrusion of said tapered point, said reservoir and connecting portion forming surface being inclined about zero up to 20 degrees relative to the longitudinal reference surface, severance means for receiving the excess material existing beyond the outer edge of said reservoir and connecting portion forming surface and for removing said excess material after the tapered point is fully formed, and means for positively rotating the workpiece during the extrusion of said tapered point comprising serrations spaced apart in the axis advancing direction on said body forming surface and said reservoir and connecting portion forming surface.*

3. In an apparatus, as set forth in claim 2, said dies comprising said extrusion means including means for removing excess material from the workpiece by extrusion during point formation, said last mentioned means having the characteristic of providing a material reservoir intact with the partially formed point and of sufficient volume to form a full point by extrusion without exerting a material rupturing force to separate said reservoir and partially formed point, and comprising means for assuring relatively unimpeded material flow from said partially formed point to said slug in only the direction from said point to said slug through said reservoir between the surfaces of the dies, said dies being of generally identical shape in any one plane through said axis and perpendicular to the advancing direction.

4. In an apparatus, relatively movable dies for rotating a cylindrical workpiece formed of extrudable material for forming a product with a body portion having a form rolled thereon and a point by relative advancing movement between said dies and *the workpiece* axis providing an axis advancing direction relative to each die, said dies including form rolling means responsive to relative die movement for rolling a form on said workpiece, and extrusion means responsive to relative die movement for forming a fully formed point on the workpiece by extrusion of at least a portion of the workpiece, said dies comprising said extrusion means comprising means for removing excess material from the workpiece by extrusion of a portion into a slug through a connecting portion during point formation with said connecting portion extending between the partially formed point and slug and having a peripheral surface approximately generated by a line rotatable about the longitudinal axis of said workpiece wherein said line is coplanar with said axis, said extrusion means comprising a surface means on said dies for forming said peripheral surface generated by said line being parallel to said axis and by said lines being symmetrical with the axis in a plane through said axis and generally perpendicular to said advancing direction.

5. In an apparatus, relatively movable dies for rotating a cylindrical workpiece formed of extrudable material for forming a product with a body portion having a form rolled thereon and a point by relative advancing movement between said dies and [axis] *the longitudinal* axis *of the workpiece* providing an axis advancing direction relative to each die, said dies including form rolling means responsive to relative die movement for rolling a form on said workpiece, extrusion means responsive to relative die movement for forming a fully formed point on the workpiece by extrusion of at least a portion of the workpiece, and means for frictionally engaging the surface of said workpiece and positively rotating said workpiece about its longitudinal axis during relative die movement, said means for frictionally engaging said workpiece surface including serrations on at least one of said dies extending generally parallel to the axis of said workpiece and spaced along the advancing direction [said dies including] said extrusion means comprising [means] *planar surfaces* for forming a point on said workpiece by extrusion of at least some of the excess material into a slug during advancing movement [and comprising means for controlling], *said surfaces* controlling *and limiting* the force for axial separation movement of said slug relative to said body portion during advancing movement; said serrations for frictionally engaging said workpiece surface extending between said point forming means and said slug movement controlling means.

[6. In an apparatus, as set forth in claim 5 said dies comprising said means for frictionally engaging said workpiece surface including serrations extending generally parallel to the axis of said workpiece and spaced along the advancing direction.]

7. In an apparatus, relatively movable dies for rotating a cylindrical workpiece formed of extrudable material for forming a gimlet point screw threaded product with a threaded body portion and threaded point by relative advancing movement between said dies and [axis] *the longitudinal* axis *of the workpiece* providing an axis advancing direction relative to each die with *the longitudinal* axis during relative movement forming a longitudinal reference surface and providing a transverse reference plane extending perpendicular to said longitudinal reference surface and said axis, said dies including thread rolling means responsive to relative die movement for rolling threads or other forms on said workpiece, extrusion means responsive to relative die movement for forming a fully formed point on the workpiece by extrusion of at least a portion of the workpiece simultaneously with rolling threads on the point and body portion, and means for frictionally engaging the surface of said workpiece and positively rotating said workpiece about its longitudinal axis during relative die movement; said extrusion means comprising [means] *planar surfaces on each die correlated* for removing excess material from the workpiece by extrusion of the extrudable portion into a slug through a connecting portion at a sufficient rate during point formation while providing a material reservoir in said connecting portion intact with the partially formed point located axially between said slug and partially formed point and of sufficient volume to form a full sharp point by extrusion without exerting a material rupturing separation force to separate said reservoir and partially formed point so that a sharp, fully formed point is obtained with said connecting portion extending between the partially formed point and slug and having a peripheral surface approximately generated by a line rotatable about the longitudinal axis of said workpiece wherein said line is coplanar with said axis and with said connecting portion decreasing uniformly in axial length and transverse dimension during said advancing movement, said extrusion means including on each die a reservoir and connecting [means,] *portion* forming surface having axially spaced edges converging in said axis advancing direction, said extrusion means comprising means for assuring relatively unimpeded material flow from said partially formed point to said slug through said reservoir along surfaces of the dies, said extrusion means being generally identical in shape on each die in a plane through said axis and generally perpendicular to said advancing direction, said excess material removing means including means for forming a point on said workpiece by extrusion at one rate during advancing movement and including means related to the axial rate of material extrusion for controlling the force for the axial separation movement of said slug relative to said body portion during advancing movement at a rate slower than said one rate and not exerting a force on said slug greater than the rupture force of the material and independent of said one rate, said last mentioned means including a slug movement controlling surface oriented relative to said transverse reference plane and to said longitudinal reference surface, said means for frictionally engaging said workpiece surface extending between said point forming means and said slug movement controlling means and including serrations on both of said dies extending generally parallel to the axis of said workpiece and spaced along the advancing direction.

8. In an apparatus, relatively movable dies for rotating a workpiece having a cylindrical body portion and an extrudable portion for forming a product with a body portion having a form rolled thereon and a point by relative advancing movement between said dies, said dies including form rolling means responsive to relative die movement for rolling a form on said workpiece, extrusion means responsive to relative die movement for forming a fully formed point on the workpiece by extrusion of at least a portion of said extrudable portion of the workpiece, and severance means responsive to relative die movement for removing excess material existing beyond the fully formed point by extruding it into an extending portion thin in cross section attached to said point and then removing said extending portion, said dies comprising said severance means including a barrier means responsive to said advancing movement for wiping off said extending portion at said point.

9. In an apparatus, relatively movable dies for rotating a workpiece formed of extrudable and work-hardenable material having a cylindrical body portion rotatable about its longitudinal axis and having an extrudable portion for forming a product with a body portion having a form rolled thereon and a point by relative advancing movement between said dies and *the workpiece* axis providing an axis advancing direction relative to each die, said dies including form rolling means responsive to relative die movement for rolling a form on said workpiece, extrusion means responsive to relative die movement for forming a fully formed point on the workpiece by extrusion of at least a portion of said extrudable portion of the workpiece, and severance means responsive to relative die movement for removing excess material existing beyond the fully formed point by extruding it into an extending portion thin in cross section and then removing said extending portion, said severance means including means for periodically oscillating said extending portion transverse to the longitudinal axis of rotation of said body portion and relative to said body portion so that said extending portion is severed.

10. In an apparatus, as set forth in claim 9, said dies comprising said severance means including a notch for receiving said extending portion at one end of its oscillation and then wiping off said extending portion at said point in response to said advancing movement.

11. In an apparatus, as set forth in claim 10, said dies comprising said severance means with the bottom of said notch on said die being located from the axis of body portion rotation a distance only slightly greater than one-half the amplitude of the oscillation of the exterior of said extending portion.

12. In an apparatus, as set forth in claim 10, said dies comprising said severance means with said notch having a depth between 0.0005 inch and one-half the amplitude of the oscillation of the exterior of said extending portion plus 0.020 inch.

13. In an apparatus, as set forth in claim 9, said dies comprising said severance means including a notch for receiving said extending portion at one end of its oscillation and then wiping off said extending portion at said point in response to said advancing movement, said notch being located in the advancing direction after said periodically oscillating means and having a length therefrom in the advancing direction approximately equal to half a rotation of said body portion.

14. In an apparatus, relatively movable dies for rotating a workpiece formed of extrudable and work-hardenable material having a cylindrical body portion rotatable about its longitudinal axis and having an extrudable portion for forming a product with a body portion having a form rolled thereon and a point by relative advancing movement between said dies and axis providing an axis advancing direction relative to each die, said dies including form rolling means responsive to relative die movement for rolling a form on said workpiece, extrusion means responsive to relative die movement for forming a fully formed point on the workpiece by extrusion of at least a portion of said extrudable portion of the workpiece, and severance means responsive to relative die movement for removing excess material existing beyond the fully formed point by extruding it into an extending portion thin in cross section and then removing said extending portion, said severance means including means responsive to rotation of said workpiece relative to said dies for periodically oscillating said extending portion transverse to the longitudinal axis of rotation of said body portion and relative to said body portion to sever said extending portion by work hardening.

15. In an apparatus, relatively movable dies for rotating a cylindrical workpiece formed of extrudable and work-hardenable material having a cylindrical body portion rotatable about its longitudinal axis and having an extrudable portion for forming a gimlet point screw threaded product with a threaded body portion and threaded point by relative advancing movement between said dies and axis providing an axis advancing direction relative to each die, said dies including thread rolling means responsive to relative die movement and operable during workpiece rotation for rolling threads or other form on said workpiece, extrusion means responsive to relative die movement and operable during workpiece rotation for forming a fully formed point on the workpiece by extrusion of at least a portion of said extrudable portion of the workpiece, and severance means responsive to relative die movement and operable during workpiece rotation for removing excess material existing beyond the fully formed point by extruding it into a slug and a connecting portion extremely thin in cross section attached to said point and connecting said slug and point and then removing said slug and connecting portion with the connecting portion approximately less than or equal to 0.011 inch in maximum transverse dimension so that the differential relative movement of the body portion and said connecting portion relative to said dies and the cold working of the thin cross section may cause detachment of said connecting portion from said point; said severance means including a wedging means for exerting a wedging force against said slug during said advancing movement to detach said slug from said tip prior to or with removal of said connecting portion, including means responsive to rotation of said workpiece relative to said dies for periodically oscillating said connecting portion transverse to the longitudinal axis of rotation of said body portion and relative to said body portion to sever said connecting portion by work hardening, and including a notch for receiving said connecting portion at one end of its oscillation and then wiping off said connecting portion at said point in response to said advancing movement, the bottom of said notch being located from the axis of body portion rotation a distance only slightly greater than one-half the amplitude of the oscillation of the exterior of said connecting portion, said notch being [located in the advancing direction after said periodically oscillating means,] in alignment with the last thread rolling portion of said thread rolling means in the advancing direction, and having a length therefrom in the advancing direction approximately equal to half a rotation of said body portion.

16. In an apparatus, as set forth in claim 15, said dies comprising a transverse reference plane extending perpendicular to said workpiece axis, said extrusion means comprising means for removing excess material from the workpiece by extrusion of the extrudable portion into a slug through a connecting portion at a sufficient rate during point formation while providing a material reservoir in said connecting portion intact with the partially formed point located axially between said slug and partially formed point and of sufficient volume to form a full sharp point by extrusion without exerting a material rupturing separation force to separate said reservoir and partially formed point so that a sharp fully formed point is obtained with said connecting portion extending between the partially formed point and slug and having a peripheral surface approximately generated by a line rotatable about the longitudinal axis of said workpiece wherein said line is coplanar with said axis and with said connecting portion decreasing uniformly in axial length and transverse dimension during advancing movement, and said extrusion means comprising means for assuring relatively unimpeded material flow from said partially formed point to said slug through said reservoir along surfaces of the dies, said excess material removing means including means for forming a point on said workpiece by extrusion at one rate during said advancing movement and including means related to the axial rate of material extrusion for controlling the force for the axial separation movement of said slug relative to said body portion during advancing movement at a rate slower than said one rate and not exerting a force on said slug greater than the rupture force of the material and independent of said one rate by an edge oriented relative to the body portion along a path of travel and by a slug movement controlling surface oriented relative to said transverse reference plane and to said longitudinal reference surface; said dies including means for frictionally engaging said workpiece surface for positively rotating said workpiece, extending between said point forming means and said slug movement controlling means, and including serrations on both of said dies extending generally parallel to the axis of said workpiece and spaced along the advancing direction.

17. In an apparatus, as set forth in claim 16, said dies having transverse die sections straddling the workpiece and coaxial with said longitudinal axis and being of generally similar and reversed cross section in workpiece contact with said workpiece having a longitudinal axis which lies in a longitudinal reference plane and a transverse reference plane extending perpendicular to said longitudinal reference plane and said axis; the aforementioned thread rolling means, extrusion means and severance means including on each of said dies a body thread forming generally planar surface located generally parallel to said longitudinal reference plane for forming threads on the cylindrical body portion, a point forming and thread rolling generally planar surface extending in the advancing direction located at one edge of said thread forming surface and inclined therefrom toward said longitudinal reference plane, said point forming and thread rolling surface including a first zone for forming said point with this surface increasing in width in the advancing direction to the end of said first zone and a second zone having thread forms for applying threads to the finished point after the formation of each portion thereof with a zone of the fully formed point located at the end of said first zone, a generally planar reservoir and connecting portion forming surface converging toward said longitudinal reference plane in said advancing direction from said body thread forming surface and located at the same edge thereof as said point forming and thread rolling surface at approximately the beginning of said point forming surface, said reservoir and connecting portion forming surface tapering in a converging direction in said advancing direction toward a point at said fully formed point zone, and a slug movement controlling surface to control the force of slug separation movement relative to said body portion, said slug movement controlling surface including a first generally planar portion axially aligned with said reservoir and connecting portion forming surface and extending in said advancing direction to said fully formed point zone, serrations on some of said surfaces, including said reservoir and connecting portion forming surface, spaced along the advancing direction and extending generally perpendicular to said transverse plane, and a generally planar excess material extrusion surface extending generally parallel to said longitudinal reference plane in the advancing direction away from the fully formed point zone at the converging end of said reservoir and connecting portion forming surface whereat said point is fully formed, said excess material extrusion surfaces on said dies having a small clearance therebetween and being located at different distances from said longitudinal plane to extrude said extrudable portion beyond said point into a connecting portion of thin cross section with a slug located at its outer end and for periodically oscillating said connecting portion during movement in said advancing direction, said slug movement controlling surface including a second portion extending from said fully formed point zone in a diverging direction with respect to said transverse plane in said advancing direction for exerting an axial detaching force against said slug, said excess material extrusion surface located closest to said longitudinal reference plane having a notch cut therein at the end thereof for wiping off said connecting portion at said point.

18. A die for rotating a cylindrical workpiece formed of extrudable material having a cylindrical body portion rotatable about its longitudinal axis and having a cylindrical extrudable portion for forming a product with a body portion and a threaded portion having a form rolled on each by relative advancing movement between said die and axis providing an axis advancing direction relative to said die, wherein said longitudinal axis lies in a longitudinal reference [surface] *plane* and a transverse reference plane extends perpendicular to said longitudinal reference [surface] *plane* and said axis, said die including a body form rolling surface located generally parallel to said longitudinal reference [surface] *plane* for rolling a form on the cylindrical body portion, a point forming and form rolling surface extending in the advancing direction located at one edge of said form rolling surface and inclined therefrom toward said longitudinal reference plane, said point forming and form rolling surface including a first zone for forming said point with this surface increasing in width in the advancing direction to the end of said first zone and a second zone having form rolling portions for rolling a form on the finished point after the formation of each portion thereof with a zone of the fully formed point located at the end of said first zone, a reservoir and connecting portion forming surface converging toward said longitudinal reference surface in said advancing direction from said body form rolling surface and located at the same edge thereof as said point forming and form rolling surface at approximately the beginning of said point forming surface, said reservoir and connecting portion forming surface tapering in a converging direction in said advancing direction toward a point at said fully formed point zone, and a slug movement controlling surface to control the force of slug separation movement relative to said body portion, said slug movement controlling surface including a first portion axially aligned with said reservoir and connecting portion forming surface and extending in said advancing direction to said fully formed point zone, and serrations on some of said surfaces, including said reservoir and connecting portion forming surface, spaced in the advancing direction and extending generally perpendicular to said transverse plane.

19. A die, as set forth in claim 18, including said body form rolling surface, [said longitudinal reference surface,] said point forming and form rolling surface, said reservoir and connecting portion forming surface, and said first portion of said slug movement controlling surface each being a generally planar surface; the intersection of said reservoir and connecting portion forming surface and of said slug movement controlling surface being an edge extending parallel to said transverse reference plane, said slug movement controlling surface intersecting said longitudinal reference [surface] *plane* at an angle of zero to 14 degrees with said transverse reference plane with said angle diverging from said transverse reference plane in the axis advancing direction, said reservoir and connecting portion forming surface intersecting a diametrical plane, extending coplanar with said longitudinal workpiece axis and perpendicular to said longitudinal reference [surface,] *plane* along a line generally parallel with said longitudinal reference plane, said slug movement controlling surface forming an angle of at least 20 but less than 90 degrees with said longitudinal reference [surface] *plane* and the axis of said workpiece.

20. A die, as set forth in claim 18, including said body form rolling surface, [said longitudinal reference surface,] said point forming and form rolling surface, said reservoir and connecting portion forming surface, and said first portion of said slug movement controlling surface each being a generally planar surface; the intersection of said reservoir and connecting portion forming surface and of said slug movement controlling surface being an edge forming an angle greater than zero and less than 14 degrees with said transverse reference plane and said slug movement controlling surface intersecting said longitudinal reference [surface] *plane* at an angle of zero to 14 degrees with said transverse reference plane with each of the last two mentioned angles diverging from said transverse reference plane in the axis advancing direction, said reservoir and connecting portion forming surface intersecting a diametrical plane, extending coplanar with said longitudinal workpiece axis and perpendicular to said longitudinal reference [surface,] *plane,* along a line forming an angle less than 20 degrees with said longitudinal reference plane, said slug movement controlling surface forming an angle of at least 20 but less than 90 degrees with said longitudinal reference [surface] *plane* and the axis of said workpiece.

21. A die, as set forth in claim 18, including said body form rolling surface, [said longitudinal reference surface,] said point forming and form rolling surface, said reservoir and connecting portion forming surface, and said first portion of said slug movement controlling surface each being a generally planar surface; the intersection of said reservoir and connecting portion forming surface and of said slug movement controlling surface being an edge forming an angle of zero to 14 degrees with said transverse reference plane, and said slug movement controlling surface intersecting said longitudinal reference [surface] *plane* at an angle of zero to 14 degrees with said transverse reference plane with each of the last two mentioned angles diverging from said transverse reference plane in the axis advancing direction, said reservoir and connecting portion forming surface intersecting a diametrical plane, extending coplanar with said longitudinal workpiece axis and perpendicular to said longitudinal reference [surface,] *plane,* along a line forming an angle less than 20 degrees with said longitudinal reference plane, said slug movement controlling surface forming an angle of 90 degrees with said longitudinal reference [surface] *plane* and the axis of said workpiece.

22. In a combination of two dies, each die being a die for rotating a cylindrical workpiece formed of extrudable material having a cylindrical body portion rotatable about its longtiudinal axis and having a cylindrical extrudable portion for forming a product with a body portion and a threaded portion having a form rolled on each by relative advancing movement between said die and axis providing an axis advancing direction relative to said die, wherein said longitudinal axis lies in a longitudinal reference surface and a transverse reference plane extends perpendicular to said longitudinal reference surface and said axis, said die including a body form rolling surface located generally parallel to said longitudinal reference surface for rolling a form on the cylindrical body portion, a point forming and form rolling surface extending in the advancing direction located at one edge of said form rolling surface and inclined therefrom toward said longitudinal reference plane, said point forming and form rolling surface including a first zone for forming said point with this surface increasing in width in the advancing direction to the end of said first zone and a second zone having form rolling portions for rolling a form on the finished point after the formation of each portion thereof with a zone of the fully formed point located at the end of said first zone, a reservoir and connecting portion forming surface converging toward said longitudinal reference surface in said advancing direction from said body form rolling surface and located at the same edge thereof as said point forming and form rolling surface at approximately the beginning of said point forming surface, said reservoir and connecting portion forming surface tapering in a converging direction in said advancing direction to a point at said fully formed point zone, and a slug movement controlling surface to control the force of slug separation movement relative to said body portion, and slug movement controlling surface including a first portion axially aligned with said reservoir and connecting portion forming surface and extending in said advancing direction to said fully formed point zone, and serrations on some of said surfaces, including said reservoir and connecting portion forming surface, spaced in the advancing direction and extending generally perpendicular to said transverse plane; transverse die sections straddling the workpiece and coaxial with said longitudinal axis being of generally similar and reversed cross section in workpiece contact, and said rolled forms being threads; each of said dies including a generally planar excess material extrusion surface extending generally parallel to said longitudinal reference plane in the advancing direction away from the fully formed point zone at the converging end of said reservoir and connecting portion forming surface whereat said point is fully formed, said excess material extrusion surfaces on said dies having a small clearance therebetween and being located at different distances from said longitudinal plane to extrude said extrudable portion beyond said point into a connecting portion of thin cross section with a slug located at its outer end and for periodically oscillating said connecting portion during movement in said advancing direction, said slug movement controlling surface including a second portion extending from said fully formed point zone in a diverging direction with respect to said transverse plane in said advancing direction for exerting an axial detaching force against said slug, said excess material extrusion surface located closest to said longitudinal reference palne having a notch cut therein at the end thereof for wiping off said connecting portion at said point.

23. Relatively movable dies for rotating a cylindrical workpiece formed of extrudable material having a cylindrical body portion rotatable about its longitudinal axis and having a cylindrical extrudable portion for forming a product with a body portion having a form rolled thereon and a point by relative advancing movement between said dies and axis providing an axis advancing direction relative to each die, said dies including form rolling means responsive to relative die movement for rolling a form on said workpiece, extrusion means responsive to relative die movement for forming a fully formed point on the workpiece by extrusion of at least a portion of said extrudable portion of the workpiece, and severance means responsive to relative die movement for removing excess material existing beyond the fully formed point by extruding it into a slug and a connecting portion extremely thin in cross section attached to said point and connecting said slug and point; wherein said longitudinal axis lies in a longitudinal reference surface and a transverse reference plane extends perpendicular to said longitudinal reference surface and said axis, wherein die sections straddling the workpiece and coaxial with said longitudinal axis are of generally similar cross section in workpiece contact, and wherein each die includes a generally planar excess material extrusion surface extending generally parallel to said longitudinal reference surface in the advancing direction away from the fully formed point at the converging end of said reservoir and connecting portion forming surface whereat said point is fully formed, said excess material extrusion surfaces on said dies having a small clearance therebetween and being located at different distances from said transverse surface to extrude said extrudable portion beyond said point into a connecting portion of thin cross section with a slug located at its outer end and for periodically oscillating said connecting portion during movement in said advancing direction, and a slug movement controlling surface extending from said fully formed point zone in a diverging direction with respect to said transverse plane in said advancing direction for exerting an axial detaching force against said slug, said excess material extrusion surface located closest to said longitudinal reference surface having a notch cut therein at the end thereof for wiping off said connecting portion at said point.

24. In an apparatus, relatively movable dies for rotating *about its axis* a workpiece having a cylindrical body portion and an extrudable portion for forming a product with a body portion having a form rolled thereon and a point by relative advancing movement between said dies, said dies including form rolling means responsive to relative die movement for rolling a form on said workpiece, extrusion means responsive to relative die movement for forming a fully formed point on the workpiece by extrusion of at least a portion of said etxrudable portion of the workpiece, *said axis lying in a longitudinal reference plane (P), said forming rolling means comprising on each die a body form rolling surface and an inclined point rolling surface for rolling a form on the body portion and the tapered point, said point rolling surface comprising a first zone gradually increasing in width in the advancing direction from the beginning of said point rolling surface to the end of said first zone and a second zone for completing the rolling of said form on the tapered point after it is formed, said extrusion means comprising a reservoir and connecting portion forming surface having an inner point forming side edge (2b, 5b, 8b) located at the outer side edge of said point forming surface and extending the full length of said first zone, said reservoir and connecting portion forming surface being inclined from said point forming edge away from the longitudinal reference plane (P) containing said axis at an angle of from zero up to 20 degrees and converging in the advancing direction from the beginning of said first zone to the end of said first zone and toward said longitudinal reference plane, and being provided with a series of laterally extending serrations,* and severance means responsive to relative die movement for removing excess material existing beyond the fully formed point by extruding it into an extending portion thin in cross section attached to said point and then removing said extending portion, said dies comprising said severance means including a barrier means for wiping off said extending portion at said point, said barrier means being located on one of said dies in alignment in the advancing direction with the extending portion.

25. In an apparatus, relatively movable dies for rotating a cylindrical workpiece formed of extrudable material for forming a product with a body portion having a form rolled thereon and a point by relative advancing movement between said dies and [axis] *the longitudinal axis of the workpiece* providing an axis advancing direction relative to each die, said dies including form rolling means responsive to relative die movement for rolling a form on said workpiece, and extrusion means responsive to relative die movement for forming a fully formed point on the workpiece by extrusion of at least a portion of the workpiece, [said dies comprising] said extrusion means comprising *planar surfaces* [means] for removing excess material from the workpiece by extrusion into a slug during point formation while providing a material reservoir intact with the partially formed point located axially between said slug and partially formed point and of sufficient volume to form a full point by extrusion without exerting a material rupturing force to separate said reservoir and partially formed point, said extrusion means including on each die a reservoir forming surface having axially spaced apart edges converging in said axis advancing direction *from spaced locations laterally adjacent each other and the place the point forming is initiated.*

26. In an apparatus, relatively movable dies for rotating a cylindrical workpiece formed of extrudable material for forming a product with a body portion having a form rolled thereon and a point by relative advancing movement between said dies and *the workpiece* axis providing an axis advancing direction relative to each die, said dies including form rolling means responsive to relative die movement for rolling a form on said workpiece, and extrusion means responsive to relative die movement for forming a fully formed point on the workpiece by extrusion of at least a portion of the workpiece, [said dies including] said extrusion means comprising [means] *planar surfaces* for forming a point on said workpiece by extrusion at one rate of at least some of the excess material into a slug during said advancing movement, [and comprising means for] *said planar surfaces* controlling the force for axial separation movement of said slug relative to said body portion during advancing movement at a rate [different from] *lesser than* said one rate, said extrusion means including on each die as said last two mentioned means *a forming surface having* axially spaced apart edges converging in the axis advancing direction *from spaced locations laterally adjacent each other and the place the point forming is initiated.*

*27. In an apparatus, as set forth in claim 2, said dies comprising said extrusion means comprising means for removing excess material from the workpiece by extrusion into a slug during point formation while providing a material reservoir intact with the partially formed point located axially between said slug and partially formed point and of sufficient volume to form a full point by extrusion without exerting a material rupturing force to separate said reservoir and partially formed point.*

*28. In an apparatus, as set forth in claim 27, said extrusion means being shaped to assure relatively unimpeded material flow from the partially formed point to said slug through said reservoir along surfaces of the dies, said serrations comprising a series of regularly spaced lateral grooves in the reservoir and connecting portion forming surface for repeatedly engaging the workpiece at a series of circumferentially spaced locations throughout its circumference and for directing the flow of the extruded material generally in an axial direction.*

*29. A thread rolling die for use in a thread rolling apparatus for forming a screw threaded product with a threaded body portion and a tapered point by relative advancing movement between a pair of dies and a cylindrical metal workpiece having an axis located in a reference plane (P) midway between the dies, said thread rolling die comprising:*

*a body thread rolling surface (2m, 5m, 8m) for rolling a helical thread on the cylindrical body portion of said workpiece having a side edge (2c, 5c, 8c) generally parallel to the direction of rolling of the workpiece,*

*a point threading surface (2p, 5p, 8p) comprising a first zone gradually increasing in width in the advancing direction from the beginning to the end of said first zone for rolling threads on the tapered point as it is formed and a second zone for completing threading of the tapered threaded point after it is formed, said point threading surface being inclined from said side edge (2c, 5c, 8c) of said body thread rolling surface toward said reference plane,*

*extrusion means for forming said tapered point comprising a reservoir and connecting portion forming surface (2n, 5n, 8n) having an inner point forming side edge (2b, 5b, 8b) located at the outer side edge of said point threading surface and extending the full length of said first zone, said reservoir and connecting portion forming surface being inclined from said point forming edge (2b, 5b, 8b) away from said reference plane at an angle of from zero up to 20 degrees and converging only continuously in the advancing direction from the beginning of said first zone to the end of said first zone and toward said reference plane, and being provided with a series of laterally extending serrations (2w, 5w, 8w).*

*30. In a process for making a gimlet point screw from a steel workpiece having a cylindrical body portion and a cylindrical extrudable end portion wherein the workpiece is cold worked to form a threaded generally cylindrical body portion and a tapered threaded point the improvement which comprises deforming said cylindrical end portion by rolling the workpiece about its longitudinal axis against a forming surface having a series of regularly spaced serrations extending generally in the direction of said axis, said longitudinal axis lying in a longitudinal reference plane (P), thereafter forming the resulting generally cylindrical end portion into said tapered point by extrusion of said cylindrical end portion into a slug through a connecting portion while providing a material reservoir in said connecting portion intact with the partially formed point, said extrusion being effected by rotating the workpiece about said axis against a reservoir and connecting portion forming surface having regularly spaced serrations extending generally in the direction of said axis to effect positive driving of the workpiece while providing relatively unimpeded flow of the displaced material from the partially formed point to said slug through said reservoir along said last-mentioned surface, the area of engagement of the latter surface with the workpiece being inclined at an angle of zero up to 20 degrees relative to the longitudinal reference plane (P) containing said axis and gradually decreasing in width throughout the extrusion of the tapered point, said extrusion causing material displacement at a sufficient axial rate to avoid application of axial rupturing force to the slug, and forming a helical thread on the partially formed point during such extrusion of the tapered point.*

*31. A thread rolling die for use in a thread rolling apparatus for forming a screw threaded product with a threaded body portion and a tapered threaded point by relative advancing movement with another similar die and a cylindrical metal workpiece having an axis in a longitudinal reference plane (P), said die comprising:*

*a planar body thread rolling surface for rolling a thread on the cylindrical body portion of said workpiece having a top edge (2a, 5a, 8a) and side edge (2c, 5c, 8c) which are parallel to each other and to the direction of advancement of the workpiece,*

*a planar point forming and thread rolling surface (2p, 5p, 8p) rising from the level of the body thread rolling surface adjacent the side edge (2c, 5c, 8c), said surface divergingly extending in the direction of advancement of the workpiece and being inclined therefrom toward the longitudinal reference plane, and a reservoir and connecting portion forming surface (2n, 5n, 8n) generally planar in form having an inner side edge (2b, 5b, 8b) adjacent for its entire length a side edge of said point forming and thread rolling surface and an outer side edge (2d, 5d, 8d), said inner and outer side edges of said reservoir surface converging in the direction of advancement of the workpiece from positions laterally adjacent to the beginning of said point forming and thread rolling surface, said reservoir surface being inclined away from the longitudinal reference plane at an angle (Z group) of from zero up to 20 degrees and being provided with a series of laterally extending serrations.*

*32. The die of claim 31 including a slug movement controlling surface (2q, 5q, 8q) located at the outer side edge of said reservoir and connecting portion forming surface and lying in a plane intersecting said longitudinal reference plane and the direction of advancement of the workpiece providing a remote slug axial separation control angle (W group) of zero to 14°.*

*33. The die of claim 31, wherein a transverse reference plane (Q) extends perpendicular to said longitudinal reference plane and said workpiece axis, wherein the angle ($X_1$) formed by the intersection of a straight line including the outer side edge (2d) of said reservoir and connecting portion forming surface and said transverse reference plane is zero, and wherein said reservoir and connecting portion forming surface lies in a plane intersecting said longitudinal reference plane and said workpiece axis at an angle ($Z_1$) of zero degree.*

*34. The die of claim 31 in which the angle determined by the intersection of the reservoir and connecting portion forming surface (5n, 8n) and planar surface (5q, 8q) (angles $X_2$, $X_3$) is greater than zero degree but less than 14 degrees.*

*35. The die of claim 31 in which the angle V group is at least 20 and less than 90 degrees.*

*36. The die of claim 31 in which the angle $V_3$ is about 90 degrees.*

(References on following page)

References Cited

The following references, cited by the Examiner, are of record in the patented file of this patent or the original patent.

UNITED STATES PATENTS

| | | | |
|---|---|---|---|
| Re. 10,928 | 5/1888 | Simonds | 72—464 |
| 319,754 | 6/1885 | Simonds | 72—469 |
| 319,756 | 6/1885 | Simonds | 72—469 |
| 358,628 | 3/1887 | Simonds | 72—469 |
| 358,629 | 3/1887 | Simonds | 72—464 |
| 444,554 | 1/1891 | Jones | 72—469 |

| | | | |
|---|---|---|---|
| 613,269 | 11/1898 | Hathorn | 72—464 |
| 1,232,876 | 7/1917 | Wilcox | 72—464 |
| 1,913,143 | 6/1933 | Robertson | 72—90 |
| 1,946,735 | 2/1934 | Frayer | 72—104 |
| 2,324,143 | 7/1943 | Erdman | 72—324 |
| 2,825,251 | 3/1958 | Rader | 72—90 |

RICHARD J. HERBST, *Primary Examiner.*

L. A. LARSON, *Assistant Examiner.*

U.S. Cl. X.R.

72—88, 469

UNITED STATES PATENT OFFICE
CERTIFICATE OF CORRECTION

Reissue No. 26,518 January 14, 1969

William L. Mau et al.

It is certified that error appears in the above identified patent and that said Letters Patent are hereby corrected as shown below:

Column 3, line 43, "[.]" should read -- [,] --. Column 8, line 58, "The" should read -- This --; line 62, "or" should read -- of --. Column 11, line 25, "2w" should read -- 2t --. Column 15, lines 32 and 33, "respectaively" should read -- respectively --; line 65, "surface" should read -- surfaces --. Column 18, line 9, "workpieces" should read -- workpiece --. Column 20, line 47, "advancting" should read -- advancing --; line 66, "serves" should read -- severs --. Column 24, lines 14 to 17, "said thread rolling means including thread rolling means for rolling threads on said point and body portion simultaneously with formation of said point by said extrusion means" should not be italicized. Column 25, line 46, "ad", in italics, should read -- and --, in italics --. Column 26, line 34, cancel "[axis]"; line 52, "for controlling]" should read -- for] --; line 67, cancel "[axis]". Column 31, line 54, "generally" should be italicized. Column 32, line 66, "and" should read -- said --. Column 33, line 21, "palne" should read -- plane --. Column 34, line 37, cancel "[axis]"; line 38, "axis" should not be italicized. Column 36, line 13, "materal", in italics, should read -- material --, in italics.

Signed and sealed this 17th day of March 1970.

(SEAL)
Attest:

EDWARD M.FLETCHER,JR.
Attesting Officer

WILLIAM E. SCHUYLER, JR.
Commissioner of Patents